US011622361B2

(12) United States Patent
Jiang et al.

(10) Patent No.: US 11,622,361 B2
(45) Date of Patent: Apr. 4, 2023

(54) MISSION CRITICAL DATA SUPPORT IN SELF-CONTAINED TIME DIVISION DUPLEX (TDD) SUBFRAME STRUCTURE

(71) Applicant: QUALCOMM Incorporated, San Diego, CA (US)

(72) Inventors: Jing Jiang, San Diego, CA (US); Tingfang Ji, San Diego, CA (US); Krishna Kiran Mukkavilli, San Diego, CA (US); Naga Bhushan, San Diego, CA (US); Joseph Binamira Soriaga, San Diego, CA (US); Chih Ping Li, San Diego, CA (US); John Edward Smee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/986,647

(22) Filed: Aug. 6, 2020

(65) Prior Publication Data

US 2020/0367266 A1    Nov. 19, 2020

Related U.S. Application Data

(63) Continuation of application No. 16/125,539, filed on Sep. 7, 2018, now Pat. No. 11,026,245, which is a
(Continued)

(51) Int. Cl.
*H04W 72/12* (2009.01)
*H04L 5/14* (2006.01)
(Continued)

(52) U.S. Cl.
CPC ....... *H04W 72/1242* (2013.01); *H04L 5/0044* (2013.01); *H04L 5/1469* (2013.01);
(Continued)

(58) Field of Classification Search
CPC ... H04L 5/0044; H04L 5/0055; H04L 5/1469; H04L 5/0007; H04L 1/1812;
(Continued)

(56) References Cited

U.S. PATENT DOCUMENTS

RE39,375 E    11/2006  Hamalainen et al.
7,515,579 B2   4/2009  Cheng et al.
(Continued)

FOREIGN PATENT DOCUMENTS

CN    1685639 A    10/2005
CN  101060389 A    10/2007
(Continued)

OTHER PUBLICATIONS

3GPP 36.211, "3rd Generation Partnership Project, Technical Specification Group Radio Access Network, Evolved Universal Terrestrial Radio Access (E-UTRA), Physical Channels and Modulation (Release 8)", 3GPP Standard, V8.5.0, Dec. 1, 2008 (Dec. 1, 2008), pp. 1-82, XP050377537.
(Continued)

*Primary Examiner* — Wutchung Chu
(74) *Attorney, Agent, or Firm* — Qualcomm IP Dept.; James Hunt Yancey, Jr.

(57) ABSTRACT

Various aspects of the present disclosure provide for enabling at least one opportunity to transmit mission critical (MiCr) data and at least one opportunity to receive MiCr data in a time division duplex (TDD) subframe during a single transmission time interval (TTI). The single TTI may be no greater than 500 microseconds. The TDD subframe may be a downlink (DL)-centric TDD subframe or an uplink (UL)-centric TDD subframe. How much of the TDD subframe is configured for the at least one opportunity to transmit the MiCr data and how much of the TDD subframe is configured for the at least one opportunity to receive the
(Continued)

MiCr data may be adjusted based on one or more characteristics of the MiCr data. The MiCr data may have a low latency requirement, a high priority requirement, and/or a high reliability requirement. Various other aspects are provided throughout the present disclosure.

24 Claims, 9 Drawing Sheets

Related U.S. Application Data continuation of application No. 14/939,966, filed on Nov. 12, 2015, now Pat. No. 10,075,970.

(60) Provisional application No. 62/133,389, filed on Mar. 15, 2015.

(51) Int. Cl.
- H04W 72/1268 (2023.01)
- H04W 72/1273 (2023.01)
- H04L 5/00 (2006.01)

(52) U.S. Cl.
CPC ... *H04W 72/1268* (2013.01); *H04W 72/1273* (2013.01); *H04W 72/1278* (2013.01); *H04L 5/0007* (2013.01); *H04L 5/0055* (2013.01); *H04L 5/0064* (2013.01)

(58) Field of Classification Search
CPC ..... H04L 1/1854; H04L 1/1887; H04L 12/18; H04L 5/14; H04L 5/0053; H04L 1/1861; H04L 1/18; H04L 1/1671; H04L 1/1858; H04L 5/0048; H04L 5/0078; H04L 5/001; H04L 5/0051; H04L 5/0057; H04L 5/0082; H04L 1/1678; H04L 5/0064; H04W 72/1242; H04W 72/1268; H04W 72/1273; H04W 72/1278; H04W 72/1289; H04W 72/0446; H04W 28/0205; H04W 72/1284; H04W 72/0413; H04W 72/042; H04W 52/146; H04W 72/0406; H04W 72/12; H04W 28/04

See application file for complete search history.

(56) References Cited

U.S. PATENT DOCUMENTS

| | | | |
|---|---|---|---|
| 8,213,345 B2 | 7/2012 | Suo et al. | |
| 8,363,597 B2 | 1/2013 | Abraham et al. | |
| 8,396,013 B2 | 3/2013 | Khandekar et al. | |
| 8,472,465 B2 | 6/2013 | Suo et al. | |
| 8,531,997 B2 | 9/2013 | Ahn et al. | |
| 8,599,702 B2 | 12/2013 | Kim et al. | |
| 8,614,977 B2 | 12/2013 | Wu et al. | |
| 8,700,023 B2 | 4/2014 | Nan et al. | |
| 8,724,636 B2 | 5/2014 | Chen et al. | |
| 8,756,477 B2 | 6/2014 | Challa et al. | |
| 8,787,344 B2 | 7/2014 | Malladi et al. | |
| 8,804,618 B2 | 8/2014 | Hu et al. | |
| 8,848,620 B2 | 9/2014 | Fan et al. | |
| 8,855,062 B2 | 10/2014 | Khandekar et al. | |
| 8,861,408 B2* | 10/2014 | Damnjanovic | ....... H04L 1/1854 |
| | | | 455/501 |
| 8,923,223 B2 | 12/2014 | Chen et al. | |
| 8,948,064 B2 | 2/2015 | Shahar | |
| 9,001,780 B2 | 4/2015 | Chen et al. | |
| 9,083,517 B2 | 7/2015 | Chen et al. | |
| 9,100,155 B2 | 8/2015 | Luo et al. | |
| 9,113,491 B2 | 8/2015 | Montojo et al. | |
| 9,154,266 B2* | 10/2015 | Yang | .............. H04L 1/1861 |
| 9,369,877 B2* | 6/2016 | Liu | .............. H04J 3/10 |
| 9,398,575 B2 | 7/2016 | Clevorn | |
| 9,584,290 B2 | 2/2017 | Prakash et al. | |
| 9,609,636 B2 | 3/2017 | Yang et al. | |
| 9,642,124 B2* | 5/2017 | Li | .............. H04W 72/042 |
| 9,814,058 B2 | 11/2017 | Jiang et al. | |
| 9,930,687 B2 | 3/2018 | Mizusawa et al. | |
| 9,936,519 B2 | 4/2018 | Mukkavilli et al. | |
| 9,955,460 B2 | 4/2018 | Tavildar et al. | |
| 9,974,093 B2 | 5/2018 | Lin et al. | |
| 9,992,790 B2 | 6/2018 | Jiang et al. | |
| 10,003,986 B2 | 6/2018 | Liu et al. | |
| 10,075,970 B2 | 9/2018 | Jiang et al. | |
| 10,111,190 B2* | 10/2018 | Pelletier | .............. H04W 52/246 |
| 10,123,219 B2 | 11/2018 | Bhushan et al. | |
| 10,219,292 B2* | 2/2019 | Damnjanovic | ....... H04L 5/0094 |
| 10,342,012 B2* | 7/2019 | Mukkavilli | ........... H04L 1/1812 |
| 10,390,361 B2* | 8/2019 | Mukkavilli | ....... H04W 72/1289 |
| 10,411,871 B2 | 9/2019 | Liu et al. | |
| 10,440,726 B2 | 10/2019 | Jiang et al. | |
| 10,499,393 B2 | 12/2019 | Mukkavilli et al. | |
| 10,512,098 B2 | 12/2019 | Jiang et al. | |
| 10,624,156 B2* | 4/2020 | Xiong | .............. H04B 7/0626 |
| 11,109,351 B2* | 8/2021 | Lee | .............. H04W 72/042 |
| 2001/0028629 A1 | 10/2001 | Uneyama et al. | |
| 2003/0108013 A1 | 6/2003 | Hwang et al. | |
| 2005/0197680 A1 | 9/2005 | Delmain et al. | |
| 2006/0062192 A1 | 3/2006 | Payne, III | |
| 2007/0211656 A1 | 9/2007 | Kwak et al. | |
| 2008/0070586 A1 | 3/2008 | Kermoal et al. | |
| 2008/0080476 A1 | 4/2008 | Cho et al. | |
| 2008/0220791 A1 | 9/2008 | Cho et al. | |
| 2009/0040999 A1 | 2/2009 | Yuk | |
| 2009/0103482 A1 | 4/2009 | Imamura et al. | |
| 2009/0129259 A1 | 5/2009 | Malladi et al. | |
| 2009/0137230 A1 | 5/2009 | Miyoshi et al. | |
| 2009/0141690 A1 | 6/2009 | Fan et al. | |
| 2009/0161591 A1 | 6/2009 | Ahmadi et al. | |
| 2009/0161649 A1 | 6/2009 | Ponnathota et al. | |
| 2009/0181689 A1 | 7/2009 | Lee et al. | |
| 2009/0201838 A1 | 8/2009 | Zhang et al. | |
| 2009/0213769 A1 | 8/2009 | Shen et al. | |
| 2009/0245194 A1 | 10/2009 | Damnjanovic et al. | |
| 2009/0276676 A1 | 11/2009 | Lee et al. | |
| 2009/0323666 A1 | 12/2009 | Malladi et al. | |
| 2010/0080137 A1 | 4/2010 | Vedantham et al. | |
| 2010/0118730 A1 | 5/2010 | Tanaka et al. | |
| 2010/0211845 A1* | 8/2010 | Lee | .............. H04L 1/1887 |
| | | | 714/748 |
| 2010/0265851 A1 | 10/2010 | Shahar | |
| 2010/0275086 A1 | 10/2010 | Bergquist et al. | |
| 2010/0309867 A1 | 12/2010 | Palanki et al. | |
| 2010/0322114 A1 | 12/2010 | Li et al. | |
| 2011/0007730 A1 | 1/2011 | Han et al. | |
| 2011/0167326 A1 | 7/2011 | Kuri et al. | |
| 2011/0188381 A1 | 8/2011 | Kim et al. | |
| 2011/0211503 A1 | 9/2011 | Che et al. | |
| 2011/0274063 A1 | 11/2011 | Li | |
| 2011/0310777 A1 | 12/2011 | Jiang et al. | |
| 2011/0310778 A1 | 12/2011 | Seo et al. | |
| 2011/0310784 A1 | 12/2011 | Park | |
| 2011/0310802 A1 | 12/2011 | Song et al. | |
| 2011/0310830 A1 | 12/2011 | Wu et al. | |
| 2012/0057547 A1 | 3/2012 | Loehr et al. | |
| 2012/0135773 A1 | 5/2012 | Shen et al. | |
| 2012/0147773 A1 | 6/2012 | Kim et al. | |
| 2012/0213187 A1* | 8/2012 | Yang | .............. H04W 72/0453 |
| | | | 370/329 |
| 2012/0230232 A1 | 9/2012 | Ji et al. | |
| 2012/0250592 A1* | 10/2012 | Chun | .............. H04L 5/1469 |
| | | | 370/280 |
| 2012/0257554 A1 | 10/2012 | Kim et al. | |
| 2012/0275355 A1* | 11/2012 | Park | .............. H04W 72/042 |
| | | | 370/329 |
| 2012/0287882 A1 | 11/2012 | Kim et al. | |
| 2012/0294204 A1 | 11/2012 | Chen et al. | |
| 2012/0300738 A1 | 11/2012 | Palanki et al. | |
| 2013/0028205 A1 | 1/2013 | Damnjanovic et al. | |
| 2013/0039193 A1 | 2/2013 | Yin et al. | |
| 2013/0039231 A1 | 2/2013 | Wang | |
| 2013/0083736 A1 | 4/2013 | Yin et al. | |

(56) References Cited

U.S. PATENT DOCUMENTS

| | | |
|---|---|---|
| 2013/0083740 A1 | 4/2013 | Eriksson et al. |
| 2013/0121186 A1 | 5/2013 | Vajapeyam et al. |
| 2013/0128781 A1 | 5/2013 | Li et al. |
| 2013/0163536 A1 | 6/2013 | Anderson et al. |
| 2013/0194980 A1 | 8/2013 | Yin et al. |
| 2013/0242822 A1* | 9/2013 | Yang ............... H04L 1/1692 370/280 |
| 2013/0242904 A1 | 9/2013 | Sartori et al. |
| 2013/0286902 A1 | 10/2013 | Chen et al. |
| 2013/0301486 A1 | 11/2013 | Kishiyama |
| 2013/0315113 A1 | 11/2013 | Seo et al. |
| 2013/0343239 A1 | 12/2013 | Damnjanovic et al. |
| 2014/0036740 A1 | 2/2014 | Lee et al. |
| 2014/0044061 A1* | 2/2014 | Yue ............... H04B 7/0632 370/329 |
| 2014/0050192 A1 | 2/2014 | Kim et al. |
| 2014/0071921 A1 | 3/2014 | Wang et al. |
| 2014/0071954 A1 | 3/2014 | Au et al. |
| 2014/0086078 A1 | 3/2014 | Malladi et al. |
| 2014/0106688 A1* | 4/2014 | Negus ............... H04B 15/00 455/90.2 |
| 2014/0120969 A1 | 5/2014 | Sang et al. |
| 2014/0126499 A1 | 5/2014 | Li et al. |
| 2014/0133369 A1 | 5/2014 | Cheng et al. |
| 2014/0146798 A1 | 5/2014 | Damnjanovic et al. |
| 2014/0153450 A1 | 6/2014 | Jang et al. |
| 2014/0153453 A1 | 6/2014 | Park et al. |
| 2014/0169238 A1 | 6/2014 | Cai et al. |
| 2014/0185539 A1 | 7/2014 | Seo et al. |
| 2014/0204783 A1 | 7/2014 | Lin et al. |
| 2014/0204807 A1 | 7/2014 | Li et al. |
| 2014/0226552 A1 | 8/2014 | Niu et al. |
| 2014/0233469 A1 | 8/2014 | Seo et al. |
| 2014/0241225 A1 | 8/2014 | Novak et al. |
| 2014/0269541 A1 | 9/2014 | Khude et al. |
| 2014/0286255 A1 | 9/2014 | Nam et al. |
| 2014/0301252 A1 | 10/2014 | Choi et al. |
| 2014/0307597 A1 | 10/2014 | Kim et al. |
| 2014/0321382 A1* | 10/2014 | Guan ............... H04L 1/1861 370/329 |
| 2014/0341091 A1 | 11/2014 | Ji et al. |
| 2014/0342745 A1 | 11/2014 | Bhushan et al. |
| 2015/0003304 A1* | 1/2015 | Wu ............... H04L 1/1854 370/280 |
| 2015/0036561 A1 | 2/2015 | Wang et al. |
| 2015/0043392 A1* | 2/2015 | Susitaival ......... H04W 72/1205 370/280 |
| 2015/0043394 A1* | 2/2015 | Lin ............... H04L 1/1812 370/280 |
| 2015/0043395 A1* | 2/2015 | Dai ............... H04L 5/14 370/280 |
| 2015/0085713 A1* | 3/2015 | He ............... H04L 1/1607 370/280 |
| 2015/0085834 A1 | 3/2015 | Liu et al. |
| 2015/0092566 A1 | 4/2015 | Balachandran et al. |
| 2015/0092703 A1 | 4/2015 | Xu et al. |
| 2015/0103702 A1 | 4/2015 | Lahetkangas et al. |
| 2015/0109972 A1 | 4/2015 | Khoryaev et al. |
| 2015/0139139 A1 | 5/2015 | Park et al. |
| 2015/0146588 A1 | 5/2015 | Park |
| 2015/0156762 A1 | 6/2015 | Hwang et al. |
| 2015/0180619 A1 | 6/2015 | Majjigi et al. |
| 2015/0180622 A1 | 6/2015 | Yoo et al. |
| 2015/0181580 A1 | 6/2015 | Aiba et al. |
| 2015/0181612 A1 | 6/2015 | Gan et al. |
| 2015/0188650 A1 | 7/2015 | Au et al. |
| 2015/0237619 A1 | 8/2015 | Yang et al. |
| 2015/0249980 A1* | 9/2015 | You ............... H04W 72/0413 370/329 |
| 2015/0264662 A1 | 9/2015 | Sahlin et al. |
| 2015/0271837 A1* | 9/2015 | Larsson ............... H04W 72/1263 370/329 |
| 2015/0312889 A1* | 10/2015 | Lee ............... H04L 1/188 370/280 |
| 2015/0326291 A1 | 11/2015 | Wong et al. |
| 2015/0333898 A1* | 11/2015 | Ji ............... H04L 5/22 370/280 |
| 2015/0349929 A1* | 12/2015 | Bhorkar ............... H04L 1/201 370/329 |
| 2015/0358918 A1 | 12/2015 | Gao et al. |
| 2016/0020891 A1* | 1/2016 | Jung ............... H04W 28/18 370/280 |
| 2016/0028512 A1* | 1/2016 | Papasakellariou .... H04L 5/0094 370/330 |
| 2016/0112181 A1 | 4/2016 | Tabet et al. |
| 2016/0119840 A1* | 4/2016 | Loehr ............... H04L 1/1812 370/331 |
| 2016/0142292 A1 | 5/2016 | Au et al. |
| 2016/0182213 A1* | 6/2016 | Golitschek Edler von Elbwart ... H04L 5/005 370/294 |
| 2016/0192396 A1 | 6/2016 | Ng |
| 2016/0205683 A1 | 7/2016 | Quan et al. |
| 2016/0205690 A1* | 7/2016 | Berggren ............... H04L 1/1861 370/280 |
| 2016/0212734 A1 | 7/2016 | He et al. |
| 2016/0219518 A1 | 7/2016 | Zhao et al. |
| 2016/0219569 A1* | 7/2016 | Kuo ............... H04W 72/042 |
| 2016/0227425 A1* | 8/2016 | Kim ............... H04L 5/0073 |
| 2016/0233904 A1 | 8/2016 | Wu et al. |
| 2016/0234834 A1* | 8/2016 | Aboul-Magd ......... H04L 1/1893 |
| 2016/0249329 A1* | 8/2016 | Au ............... H04W 48/00 |
| 2016/0270060 A1* | 9/2016 | Kusashima ......... H04L 1/1854 |
| 2016/0270070 A1 | 9/2016 | Mukkavilli et al. |
| 2016/0270103 A1 | 9/2016 | Jiang et al. |
| 2016/0270115 A1 | 9/2016 | Mukkavilli et al. |
| 2016/0294531 A1 | 10/2016 | Loehr et al. |
| 2016/0315741 A1 | 10/2016 | Tsai et al. |
| 2016/0323852 A1 | 11/2016 | Golitschek et al. |
| 2016/0323854 A1 | 11/2016 | Gao et al. |
| 2016/0330010 A1* | 11/2016 | Qin ............... H04W 72/02 |
| 2016/0330737 A1 | 11/2016 | Takeda et al. |
| 2016/0338081 A1* | 11/2016 | Jiang ............... H04L 1/00 |
| 2016/0366704 A1 | 12/2016 | Lee et al. |
| 2016/0374082 A1* | 12/2016 | Nguyen ............... H04W 72/044 |
| 2017/0013565 A1* | 1/2017 | Pelletier ............... H04W 72/0473 |
| 2017/0013610 A1 | 1/2017 | Lee et al. |
| 2017/0013673 A1* | 1/2017 | Uchino ............... H04W 72/0446 |
| 2017/0019905 A1 | 1/2017 | Ko et al. |
| 2017/0019930 A1 | 1/2017 | Lee et al. |
| 2017/0085344 A1* | 3/2017 | Yang ............... H04L 5/1469 |
| 2017/0111106 A1* | 4/2017 | Lee ............... H04L 1/18 |
| 2017/0118743 A1* | 4/2017 | Kim ............... H04L 5/003 |
| 2017/0150367 A1 | 5/2017 | Han et al. |
| 2017/0150424 A1 | 5/2017 | Lee et al. |
| 2017/0215188 A1* | 7/2017 | Kim ............... H04L 5/0091 |
| 2017/0215201 A1 | 7/2017 | Kim et al. |
| 2017/0257878 A1 | 9/2017 | Kazmi et al. |
| 2017/0290008 A1* | 10/2017 | Tooher ............... H04W 72/0446 |
| 2017/0303144 A1 | 10/2017 | Guo et al. |
| 2017/0318564 A1* | 11/2017 | Lee ............... H04L 5/0087 |
| 2017/0367058 A1* | 12/2017 | Pelletier ............... H04W 52/246 |
| 2017/0367084 A1* | 12/2017 | Cheng ............... H04W 28/04 |
| 2018/0006743 A1 | 1/2018 | Zhu et al. |
| 2018/0035430 A1* | 2/2018 | Futaki ............... H04W 72/04 |
| 2018/0041312 A1* | 2/2018 | Li ............... H04W 72/0446 |
| 2018/0042035 A1 | 2/2018 | Jiang et al. |
| 2018/0048431 A1* | 2/2018 | Wang ............... H04L 1/1864 |
| 2018/0098348 A1 | 4/2018 | Mukkavilli et al. |
| 2018/0124783 A1 | 5/2018 | Mukkavilli et al. |
| 2018/0198570 A1* | 7/2018 | Astely ............... H04L 1/1896 |
| 2018/0294943 A1* | 10/2018 | Hwang ............... H04L 1/1829 |
| 2019/0007956 A1 | 1/2019 | Jiang et al. |
| 2019/0098622 A1* | 3/2019 | Lee ............... H04W 52/367 |
| 2019/0222364 A1* | 7/2019 | Shimoda ............... H04L 5/0007 |
| 2019/0289602 A1 | 9/2019 | Mukkavilli et al. |
| 2019/0335481 A1 | 10/2019 | Jiang et al. |
| 2019/0373629 A1 | 12/2019 | Mukkavilli et al. |

(56) References Cited

U.S. PATENT DOCUMENTS

| | | |
|---|---|---|
| 2020/0084784 A1 | 3/2020 | Jiang et al. |
| 2021/0274498 A1 | 9/2021 | Mukkavilli et al. |

FOREIGN PATENT DOCUMENTS

| | | |
|---|---|---|
| CN | 101132262 A | 2/2008 |
| CN | 101156322 A | 4/2008 |
| CN | 101179751 A | 5/2008 |
| CN | 101507169 A | 8/2009 |
| CN | 101567773 A | 10/2009 |
| CN | 101836493 A | 9/2010 |
| CN | 101933284 A | 12/2010 |
| CN | 102014514 A | 4/2011 |
| CN | 102150468 A | 8/2011 |
| CN | 102271016 A | 12/2011 |
| CN | 102273095 A | 12/2011 |
| CN | 102404841 A | 4/2012 |
| CN | 102437901 A | 5/2012 |
| CN | 102611525 A | 7/2012 |
| CN | 102687451 A | 9/2012 |
| CN | 102763363 A | 10/2012 |
| CN | 101389120 B | 12/2012 |
| CN | 103190192 A | 7/2013 |
| CN | 103199964 A | 7/2013 |
| CN | 103563273 A | 2/2014 |
| CN | 103716143 A | 4/2014 |
| CN | 103825671 A | 5/2014 |
| CN | 103840931 A | 6/2014 |
| CN | 103858498 A | 6/2014 |
| CN | 103931135 A | 7/2014 |
| CN | 103973397 A | 8/2014 |
| CN | 103973417 A | 8/2014 |
| CN | 104170294 A | 11/2014 |
| CN | 104218956 A | 12/2014 |
| CN | 104348582 A | 2/2015 |
| CN | 104348589 A | 2/2015 |
| CN | 104348602 A | 2/2015 |
| CN | 107409032 A | 11/2017 |
| CN | 107534899 A | 1/2018 |
| CN | 107580764 A | 1/2018 |
| CN | 107624251 A | 1/2018 |
| EP | 2836044 A1 | 2/2015 |
| EP | 2947792 A1 | 11/2015 |
| EP | 3291599 A1 | 3/2018 |
| JP | 2011503975 A | 1/2011 |
| JP | 2012175258 A | 9/2012 |
| JP | 2012523770 A | 10/2012 |
| JP | 2013517639 A | 5/2013 |
| JP | 2013544473 A | 12/2013 |
| JP | 2014500685 A | 1/2014 |
| JP | 2014516321 A | 7/2014 |
| JP | 2014222923 A | 11/2014 |
| JP | 6449480 B2 | 1/2019 |
| KR | 20090090994 A | 8/2009 |
| KR | 20100138852 A | 12/2010 |
| KR | 20120052971 A | 5/2012 |
| KR | 20140012658 A | 2/2014 |
| KR | 20140073534 A | 6/2014 |
| KR | 20140077606 A | 6/2014 |
| KR | 20140096433 A | 8/2014 |
| KR | 20150013458 A | 2/2015 |
| KR | 20150013561 A | 2/2015 |
| KR | 20150052002 A | 5/2015 |
| TW | I456936 B | 10/2014 |
| TW | 201446052 A | 12/2014 |
| TW | 201507415 A | 2/2015 |
| TW | I477175 B | 3/2015 |
| WO | WO-2008028006 | 3/2008 |
| WO | 2008042541 A1 | 4/2008 |
| WO | WO-2009022391 A1 | 2/2009 |
| WO | 2009104922 A2 | 8/2009 |
| WO | WO-2009100069 A2 | 8/2009 |
| WO | WO-2009124079 A1 | 10/2009 |
| WO | WO-2010118371 A1 | 10/2010 |
| WO | 2010138925 A1 | 12/2010 |
| WO | 2011011636 A2 | 1/2011 |
| WO | 2011019223 A2 | 2/2011 |
| WO | WO-2011052961 A2 * | 5/2011 | ........... H04L 1/0027 |
| WO | 2011071944 | 6/2011 |
| WO | 2011140109 A1 | 11/2011 |
| WO | 2011163265 A1 | 12/2011 |
| WO | WO-2012024141 | 2/2012 |
| WO | 2012064935 A1 | 5/2012 |
| WO | WO-2012068141 A1 | 5/2012 |
| WO | 2012102739 A1 | 8/2012 |
| WO | WO-2012168092 A1 | 12/2012 |
| WO | 2013015587 A2 | 1/2013 |
| WO | WO-2013025502 A2 | 2/2013 |
| WO | 2013103270 A1 | 7/2013 |
| WO | 2013112320 A1 | 8/2013 |
| WO | WO-2013110228 A1 | 8/2013 |
| WO | 2013157894 A1 | 10/2013 |
| WO | WO-2013175181 A1 | 11/2013 |
| WO | WO-2013176597 A1 | 11/2013 |
| WO | WO-2014003104 A1 | 1/2014 |
| WO | 2014056430 A1 | 4/2014 |
| WO | WO-2014067140 A1 | 5/2014 |
| WO | 2014112802 A1 | 7/2014 |
| WO | WO-2014179964 A1 | 11/2014 |
| WO | 2015048361 A1 | 4/2015 |
| WO | WO-2016148877 A1 | 9/2016 |
| WO | WO-2016148878 | 9/2016 |
| WO | 2016175015 A1 | 11/2016 |
| WO | WO-2017123276 A1 * | 7/2017 | ........... H04B 7/0626 |

OTHER PUBLICATIONS

"3rd Generation Partnership Project; Technical Specification Group Radio Access Network; Evolved Universal Terrestrial Radio Access (E-UTRA); Physical channels and modulation (Release 12)", 3GPP Standard; 3GPP TS 36.211, 3rd Generation Partnership Project (3GPP), Mobile Competence Centre ; 650 , Route Des Lucioles ; F-06921 Sophia-Antipolis Cedex; France, vol. RAN WG1, No. V12.4.0, Jan. 3, 2015 (Jan. 3, 2015), pp. 1-124, XP050927386, [retrieved on Jan. 3, 2015] chapter 1 "scope" chapter 4 "Frame structure".

CATT: "ACK/NACKs Transmission in UpPTS", Agenda Item: 6.1.7,R1-080175, 3GPP TSG RAN WG1 meeting #51 bis, Sevilla, Spain, Jan. 14-18, 2008, 7 pages.

"Chapter 12: Retransmission Protocols" In: Erik Dahlman: "4G LTE/LTE-Advanced for Mobile Broadband", Nov. 30, 2013 (Nov. 30, 2013), Academic Press, XP002758475, pp. 299-319, Sections 12.1, 12.1.3.2.

Co-pending U.S. Appl. No. 15/857,543, filed Dec. 28, 2017.

Co-pending U.S. Appl. No. 15/857,571, filed Dec. 28, 2017.

Eeva L., et al., "Achieving Low Latency and Energy Consumption by 5G TDD Mode Optimization," 2014 IEEE International Conference on Communications Workshops (ICC), IEEE, Jun. 10, 2014 (Jun. 10, 2014), pp. 1-6, XP032630839, DOI: 10.1109/ICCW.2014.6881163 [retrieved on Aug. 20, 2014].

Ericsson: "Usage of DwPTS", 3GPP TSG-RAN WG1 #51 bis, Agenda Item: 6.1.7,R1-080347, Sevilla, Spain, Jan. 14-18, 2008, 3 pages.

European Search Report—EP18189408—Search Authority—The Hague—dated Apr. 8, 2019.

European Search Report—EP18195740—Search Authority—The Hague—dated Dec. 13, 2018.

European Search Report—EP19193188—Search Authority—The Hague—dated Oct. 28, 2019.

European Search Report—EP20153120—Search Authority—The Hague—dated May 4, 2020.

International Preliminary Reporton Patentability—PCT/US2016/019935, The International Bureau of WIPO—Geneva, Switzerland, dated Sep. 28, 2017.

International Preliminary Report on Patentability—PCT/US2016/019941, The International Bureau of WIPO—Geneva, Switzerland, dated Sep. 28, 2017.

(56) References Cited

OTHER PUBLICATIONS

International Preliminary Report on Patentability—PCT/US2016/019942, The International Bureau of WIPO—Geneva, Switzerland, dated Sep. 28, 2017.
"International Preliminary Report on Patentability—PCT/US2016/022511, The International Bureau of WIPO—Geneva, Switzerland, dated Sep. 19, 2012".
International Preliminary Reporton Patentability—PCT/US2016/032526, International Search Authority—European Patent Office, dated Nov. 30, 2017.
International Search Report and Written Opinion—PCT/US2016/019935—ISA/EPO—dated Jun. 30, 2016.
International Search Report and Written Opinion—PCT/US2016/019942—ISA/EPO—dated May 20, 2016.
International Search Report and Written Opinion—PCT/US2016/022511—ISA/EPO—dated Jun. 23, 2016.
International Search Report and Written Opinion—PCT/US2016/032526—ISA/EPO—dated Nov. 7, 2016.
International Search Report and Written Opinion—PCT/US2016/019941—ISA/EPO—dated Jul. 7, 2016.
JPO Appeal Decision for JP Application No. 2017-559010 (Appeal No. 2018-13500) mailed Aug. 26, 2019 (original Japanese language document provided by Japanese Patent Office; English-language translation provided by JP counsel).
Lahetkangas E., et al., "On the TDD Subframe Structure for Beyond 4G Radio Access Network", 2013 Future Network & Mobile Summit, Article No. 6633569, Jul. 3, 2013 (Jul. 3, 2013), pp. 1-10, XP055335904, Title; Section 3; Figures 3, 6-7.
Levanen T., et al., "Dense Small-Cell Networks: Rethinking the Radio Interface Beyond LTE-Advanced", 2014 1st International Conference on 5G for Ubiquitous Connectivity, ICST, Feb. 12, 2015, pp. 163-169, XP032735039, DOI: 10.4108/ICST.5GU.2014.258115 [retrieved on Feb. 11, 2015].
Levanen T., et al., "Radio Interface Design for Ultra-Low Latency Millimeter-Wave Communications in 5G Era", IEEE Globecom Workshops, Dec. 8-12, 2014, pp. 1420-1426.
Levanen T.A., et al., "Radio Interface Evolution Towards 5G and Enhanced Local Area Communications", IEEE Access, vol. 2, Sep. 17, 2014 (Sep. 17, 2014), pp. 1005-1029, XP011559830, DOI: 10.1109/ACCESS.2014.2355415, https://ieeexplore.ieee.org/stamp/stamp.jsp?tp=&arnumber=6891105,Section V; figures 2,4; tables 8,12, Section VI.A; figure 5.
Lu Y., et al., "Uplink Control for Low Latency HARQ in TDD Carrier Aggregation", 2012 IEEE 75th Vehicular Technology Conference (VTC Spring), IEEE, May 6, 2012 (May 6, 2012), pp. 1-5, XP032202607, DOI: 10.1109/VETECS.2012.6240190, ISBN: 978-1-4673-0989-9, abstract Section I; p. 1.
Mediatek Inc: "Discussions on UL HARQ for Rel-13 MTC UE", 3GPP Draft, R1-150675 Discussions on UL HARQ for Rel-13 MTC UE, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 9, 2015-Feb. 13, 2015 Feb. 8, 2015 (Feb. 8, 2015), pp. 1-5, XP050933875, Retrieved from the Internet: http://www.3gpp.org/ftp/Meetings_3GPP_SYNC/RAN1/Docs/ [retrieved on Feb. 8, 2015] Section 2.
NEC Group: "UL&DL Timing Coupling Issue for TDD eIMTA System", Agenda Item: 7.2.3.3,R1-133341, 3GPP TSG RAN WG1 Meeting #74, Barcelona, Spain, Aug. 19-23, 2013, 4 pages.
Nokia: "On HARQ/Scheduling Timing and Self-Contained Operation", 3GPP TSG-RAN WG1 #86 Bis, R1-1609742, Lisbon, Portugal, Oct. 10-14, 2016, 6 Pages.
Partial European Search Report—EP18189408—Search Authority—The Hague—dated Nov. 30, 2018.
Partial International Search Report—PCT/US2016/032526—ISA/EPO—dated Sep. 14, 2016.
Pedersen K., et al., "A Flexible Frame Structure for 5G Wide Area", 2015 IEEE 82nd Vehicular Technology Conference (VTC 2015—Fall), Sep. 6, 2015, pp. 1-5, XP032856972, DOI: 10.1109/VTCFALL.2015.7390791 [retrieved on Jan. 25, 2016], 5 pages.
Popovski P., et al., "Deliverable D2.3 Components of a new air interface- building blocks and performance," Mobile and wireless communications Enablers for the Twenty-twenty Information Society, ICT-317669-METIS/D2.3, 2014, pp. 117.
Popovski P., et al., "Deliverable D2.4 Proposed solutions for new radio access," Mobile and wireless communications Enablers for the Twenty-twenty Information Society, IICT—317669-METIS/D2.4, 2015, pp. 190.
Qualcomm Technologies Inc: "The 5G Unified Air Interface Scalable to an Extreme Variation of Requirements", Nov. 2015, 46 pages.
Smee J.E., "5G Design Across Services", May 12, 2015 (May 12, 2015), XP055299081, 23 Pages, Retrieved from the Internet: URL: https://johannesbergsummit.com/wp-content/uploads/sites/6/2014/11/Tuesday_3_John-Smee.pdf [retrieved on Aug. 31, 2016].
Soret B., et al., "Fundamental Tradeoffs among Reliability, Latency and Throughput in Cellular Networks," IEEE Proceedings of GLOBECOM, Dec. 2014, pp. 1391-1396.
Taiwan Search Report—TW105105905—TIPO—dated Mar. 28, 2019.
Taiwan Search Report—TW105105682—TIPO—dated Aug. 15, 2019.
Taiwan Search Report—TW105105683—TIPO—dated Sep. 6, 2018.
Taiwan Search Report—TW107136857—TIPO—dated Aug. 21, 2019.
Texas Instruments: "TDD System Evaluation of Multi-Bit ACK/NAK and ACK/NAK Bundling", Agenda Item: 6.3,R1-083128, 3GPP TSG RAN WG1 #54, Jeju, South Korea, Aug. 18-22, 2008, 4 pages.
Tiedemann E., et al., "5G: The Next Generation (Big Wave) of Wireless," Jul. 22, 2015 (Jul. 22, 2015), XP055280307, Retrieved from the Internet URL:https://www.nttdocomo.co.jp/binary/pdf/corporate/technology/rd/tech/5g/NTTDocomo 5G TBS lecture6.pdf.
Toni L., et al., "Low latency radio interface for 5G flexible TDD local area conmunications", 2014 IEEE International Conference on Communications Workshops (ICC), IEEE, Jun. 10, 2014 (Jun. 10, 2014), pp. 7-13, XP032630785, DOI: 10.1109/ICCW.2014.6881164 [retrieved on Aug. 20, 2014] the whole document.
Zte: "Issues About Data Transmission in TDD-eIMTA", 3GPP Draft, R1-132108 Issues About Data Transmission In TDD-eIMTA, 3rd Generation Partnership Project (3GPP), Mobile Competence Centre, 650, Route Des Lucioles, F-06921 Sophia-Antipolis Cedex, France, vol. RAN WG1, No. Fukuoka, Japan, May 20, 2013-May 24, 2013 May 11, 2013 (May 11, 2013), pp. 1-4, XP050697886, Retrieved from the Internet: URL: http://www.3gpp.org/ftp/tsg_ran/WG1_RL1/TSGR1_73/Docs/ [retrieved on May 11, 2013] the whole document.
ETRI: "Discussion on HARQ Operation for LAA", [Online] Feb. 8, 2015 (Feb. 8, 2015), 3GPP Draft, 3GPP TSG RAN WG1 Meeting #80, R1-150633-Discussion on HARQ Operation For LAA, 3rd Generation Partnership Project (3GPP), Mobile Competence Centre, 650, Route Des Lucioles, F-06921 Sophia-Antipolis Cedex, France, , vol. RAN WG1, No. Athens, Greece, Feb. 9, 2015-Feb. 13, 2015, XP050933836, pp. 1-12, Retrieved from the Internet: URL:http://www.3gpp.org/ftp/Meetings_3GPP_SYNC/RAN1/Docs/,[retrieved on Feb. 8, 2015] the whole document, Section 3.3, p. 1-p. 4.
European Search Report—EP20205939—Search Authority—The Hauge—dated Feb. 16, 2021.
European Search Report—EP20205946—Search Authority—The Hague—dated Feb. 22, 2021.
Chen S., "A Novel TD-LTE Frame Structure for Heavy Uplink Traffic in Smart Grid", 2014 IEEE Innovative Smart Grid Technologies—Asia (ISGT Asia), May 23, 2014 (May 23, 2014).
CNIPA Office Action dated Sep. 25, 2019 for Chinese Counterpart Application No. 201680015457.7 (for Self-contained time division duplex (TDD) subframe structure for wireless communications).
Taiwan Search Report—TW108116714—TIPO—dated Aug. 6, 2020.
Ericsson et al., "CSI Feedback Signaling Feedback", R1-103840, 3GPP TSG-RAN WG1 61 bis, Dresden, Germany, Jun. 28-Jul. 2, 2010, Jun. 22, 2010, 4 Pages.
Qualcomm, Number of HARQ Interlaces Defined UE Category for Self-contained TDD Subframe, Jun. 8, 2014, 8 pages.

(56) References Cited

OTHER PUBLICATIONS

Huawei, et al., "Discussion on new Frame Structure for Latency Reduction in TDD", 3GPP TSG RAN WG1 Meeting #84, R1-160754, St. Julian's, Malta, Feb. 15-19, 2016, 9 Pages.

Qualcomm Incorporated: "Summary of Email Discussion on Frame Structure", 3GPP TSG-RAN WG1 #85, 3GPP Draft; R1-165456_Frame_Structure_Discussion, 3rd Generation Partnership Project (3GPP), Mobile Competence Centre; 650, Route Des Lucioles; F-06921 Sophia-Antipolis Cedex; France, vol. RAN WG1, No. Nanjing, China; May 23, 2016-May 27, 2016, May 24, 2016 (May 24, 2016), pp. 1-28, XP051104210, Retrieved from the Internet: URL: http://www.3gpp.org/ftp/Meetings_3GPP_SYNC/RAN1/Docs/ [retrieved on May 24, 2016].

ETSI MCC: "Report of RAN2 RAN2 #87bis", R2-144750, 3GPP TSG-RAN Working Group 2 meeting #88, San Francisco, USA, Nov. 16-21, 2014, 124 Pages.

Jiafan W., "TD-SCDMA Base Station Lub Interface Design and Implementation of Protocol Software", China Excellent Master Degree Thesis Full-text database, Nov. 30, 2009, 95 pages.

Qilong H., et al., "Design and Implementation of TDD System Baseband Transmission Protocol", Chinese Master's Theses Full-text Database Information Science and Technology, Jan. 15, 2014.

Qualcomm Incorporated: "Draft TP for D2D for TS 36.300", 3GPP TSG-RAN WG1 #78, R1-142966, Aug. 18-22, 2014, Dresden, Germany, 19 Pages.

RITT: "Introduction of Optimized FS2 for TDD", R1-080660, 3GPP TSG-RAN WG1 Meeting #52, Sorrento, Italy, Feb. 11-15, 2008, 19 Pages.

Ying B., et al., "HARQ-Based TD-LTE Base Station Performance Test Scheme", Foreign Electronic Measurement Technology, No. 9, Sep. 22, 2010.

Qilong H., "Design and Implementation of Baseband Transport Protocol in TDD System", Chinese Master's Theses Full-text Database Information Science and Technology, May 27, 2013, 75 pages.

Ying B., et al., "TD-LTE eNB Performance Test Solution Based on HARQ", Foreign Electronic Measurement Technology, vol. 29, No. 9, Sep. 22, 2010, pp. 1-3.

* cited by examiner

MISSION CRITICAL DATA SUPPORT IN SELF-CONTAINED TIME DIVISION DUPLEX (TDD) SUBFRAME STRUCTURE

PRIORITY CLAIM

The present application for patent is a continuation of patent application Ser. No. 16/125,539 filed in the United States patent and Trademark Office on Sep. 7, 2018, which is a continuation of application Ser. No. 14/939,966, filed in the United States Patent and Trademark Office on Nov. 12, 2015 and granted as U.S. Pat. No. 10,075,970 on Sep. 11, 2018, which claims priority to and benefit of U.S. provisional patent application No. 62/133,389 filed in the United States Patent and Trademark Office on Mar. 15, 2015. The entire contents of said applications are hereby incorporated herein by reference as if fully set forth below in their entireties and for all applicable purposes.

TECHNICAL FIELD

Aspects of the present disclosure relate, generally, to wireless communication systems and, more particularly, to mission critical data support in self-contained time division duplex (TDD) subframe structure.

BACKGROUND

Wireless communication networks are widely deployed to provide various communication services such as telephony, video, data, messaging, broadcasts, and so on. Such networks, which are usually multiple access networks, support communications for multiple users by sharing the available network resources. The spectrum allocated to such wireless communication networks can include licensed spectrum and/or unlicensed spectrum. Licensed spectrum is generally restricted in its use for wireless communication except for licensed use as regulated by a governmental body or other authority within a given region. Unlicensed spectrum is generally free to use, within limits, without the purchase or use of such a license. The demand for wireless communication continues to increase for many use cases, including but not limited to telephones, smart phones, personal computers, smart meters, remote sensors, smart alarms, mesh nodes, and many others. Time division duplex (TDD) carriers may be utilized in many wireless communication networks. Enhancements directed to TDD carriers may benefit such wireless communication networks and the overall user experience.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the present disclosure provides an apparatus for wireless communication. The apparatus includes a transceiver, a memory, and at least one processor communicatively coupled to the transceiver and the memory. The at least one processor and the memory may be configured to generate instructions for the transceiver to enable at least one opportunity to transmit mission critical (MiCr) data and at least one opportunity to receive MiCr data in a time division duplex (TDD) subframe during a single transmission time interval (TTI). The at least one processor and the memory may be further configured to communicate the MiCr data in the TDD subframe during the single TTI.

In another aspect, the present disclosure provides a method for wireless communication. The method may include generating instructions for a transceiver to enable at least one opportunity to transmit MiCr data and at least one opportunity to receive MiCr data in a TDD subframe during a single TTI. The method may also include communicating the MiCr data in the TDD subframe during the single TTI.

In yet another aspect, the present disclosure provides a computer-readable medium configured for wireless communication. The computer-readable medium includes computer-executable instructions that may be configured for enabling at least one opportunity to transmit MiCr data and at least one opportunity to receive MiCr data in a TDD subframe during a single TTI. The computer-executable instructions may be further configured for communicating the MiCr data in the TDD subframe during the single TTI.

In a further aspect of the present disclosure, the present disclosure provides an apparatus for wireless communication. The apparatus may include means for enabling at least one opportunity to transmit MiCr data and at least one opportunity to receive MiCr data in a TDD subframe during a single TTI. The apparatus may also include means for communicating the MiCr data in the TDD subframe during the single TTI.

These and other aspects of the present disclosure will become more fully understood upon a review of the detailed description, which follows. Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DESCRIPTION OF SOME EXAMPLES

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The various concepts presented throughout this disclosure may be implemented across a broad variety of telecommunication systems, network architectures, and communication standards. The 3rd Generation Partnership Project (3GPP) is a standards body that defines several wireless communication standards for networks involving an evolved packet system (EPS), which may sometimes be referred to as long-term evolution (LTE) network. In an LTE network, packets may utilize the same or similar latency targets. As such, an LTE network may provide a one-size-fits-all latency configuration. Evolved versions of an LTE network, such as a fifth-generation (5G) network, may provide many different types of services and/or applications (e.g., web browsing, video streaming, VoIP, mission critical applications, multi-hop networks, remote operations with real-time feedback, tele-surgery, and others). Such services and/or applications may benefit from latency targets that can differ considerably from one another. However, the one-size-fits-all latency configuration of an LTE network can make multiplexing of traffic with different latency targets challenging. The spectrum compatibility of a system that supports such diverse latency targets can also be challenging. For example, time multiplexing of regular traffic and low latency traffic (e.g., mission critical (MiCr) data) may violate certain requirements of the low latency traffic (e.g., MiCr data). Furthermore, reserved frequency domain resources for low latency traffic (e.g., MiCr data) may limit the peak rate and trunking efficiency. Accordingly, support for multiplexing various types, classes, and categories of traffic and services having considerably different latency characteristics may enhance such next-generation networks (e.g., 5G networks) and the overall user experience.

Figure 1:
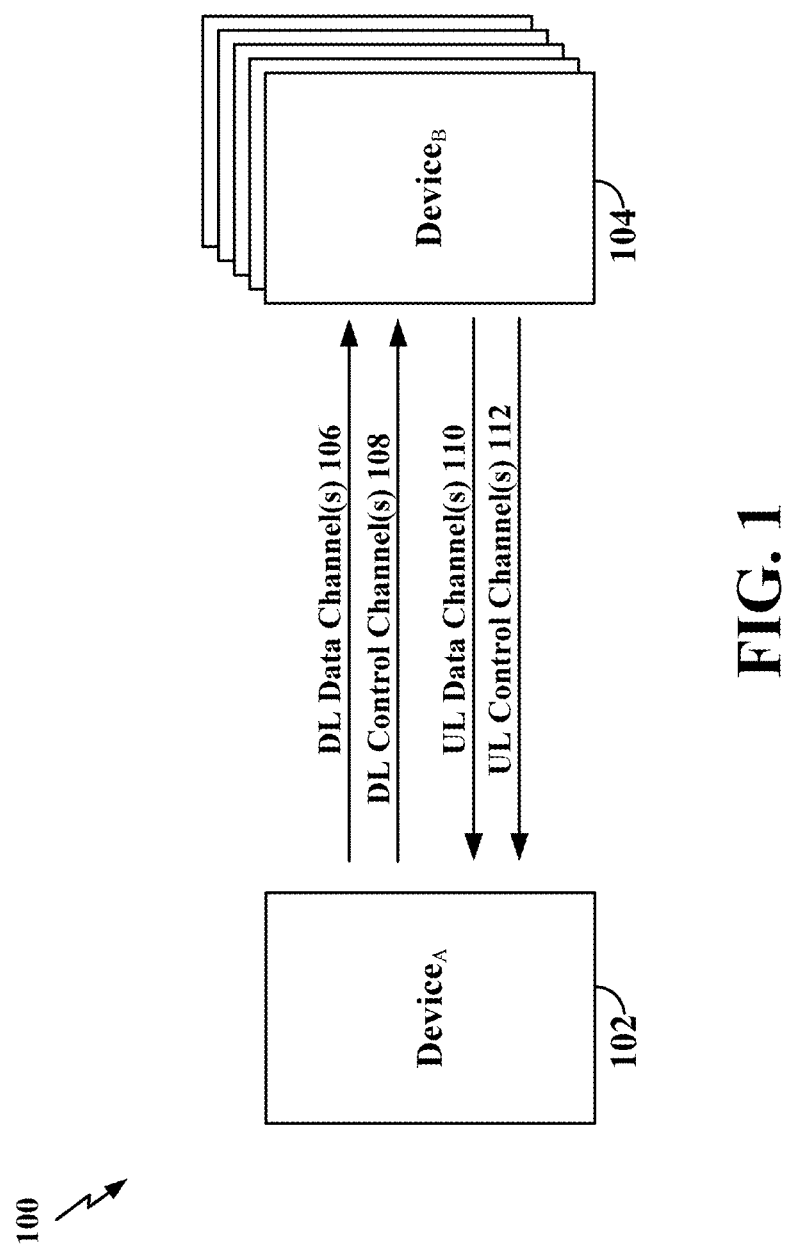
FIG. 1 is a block diagram illustrating an example of various uplink (UL) and downlink (DL) communications between two devices.

FIG. 1 is a block diagram illustrating an example of various uplink (UL) and downlink (DL) communications between two devices. In accordance with aspects of the present disclosure, the term 'downlink' may refer to a point-to-multipoint transmission originating at $Device_A$ 102, and the term 'uplink' may refer to a point-to-point transmission originating at $Device_B$ 104. Broadly, $Device_A$ 102 is a node or device responsible for scheduling traffic in a wireless communication network, including various DL and UL transmissions. $Device_A$ 102 may sometimes be referred to as a scheduling entity, a scheduler, and/or any other suitable term without deviating from the scope of the present disclosure. $Device_A$ 102 may be, or may reside within, a base station, a base transceiver station, a radio base station, a radio transceiver, a transceiver function, a basic service set, an extended service set, an access point, a Node B, a user equipment (UE), a mesh node, a relay, a peer, and/or any other suitable device.

Broadly, $Device_B$ 104 is a node or device that receives scheduling and/or control information, including but not limited to scheduling grants, synchronization or timing information, or other control information from another entity in the wireless communication network, such as $Device_A$ 102. $Device_B$ 104 may be a referred to as a subordinate entity, a schedulee, and/or any other suitable term without deviating from the scope of the present disclosure. $Device_B$ 104 may be, or may reside within, a UE, a cellular phone, a smart phone, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, a mesh node, a peer, a session initiation protocol phone, a laptop, a notebook, a netbook, a smartbook, a personal digital assistant, a satellite radio, a global positioning system device, a multimedia device, a video device, a digital audio player, a camera, a game console, an entertainment device, a vehicle component, a wearable computing device (e.g., a smart watch, glasses, a health or fitness tracker, etc.), an appliance, a sensor, a vending machine, and/or any other suitable device.

$Device_A$ 102 may transmit DL data channel(s) 106 and DL control channel(s) 108. $Device_B$ 102 may transmit UL data channel(s) 110 and UL control channel(s) 112. The channels illustrated in FIG. 1 are not necessarily all of the channels that may be utilized by $Device_A$ 102 and $Device_B$ 104. Those of ordinary skill in the art will recognize that other channels may be utilized in addition to those illustrated, such as other data, control, and feedback channels.

As described above, some data may be characterized as MiCr data. In some configurations, MiCr data refers to data that has a relatively low or ultra-low latency requirement. For example, the latency requirement of MiCr data may be lower than the latency requirement of other data included in that subframe. Generally, latency refers to the delay associated with receipt of data at its intended destination. In some configurations, MiCr data refers to data that has a relatively high priority requirement. For example, the priority requirement of MiCr data may be higher than the priority requirement of other data included in the subframe. Generally, priority refers to the importance or time-sensitivity of the data. Data having relatively higher importance and/or relatively greater time-sensitivity should be received before other data having relatively lesser importance and/or relatively lesser time-sensitivity. In some configurations, MiCr data refers to data that has a relatively high reliability requirement. For example, the reliability requirement of MiCr data may be greater than the reliability requirement of other data included in that subframe. Generally, reliability refers to how consistently data is successfully received by the intended destination without errors.

Figure 2:
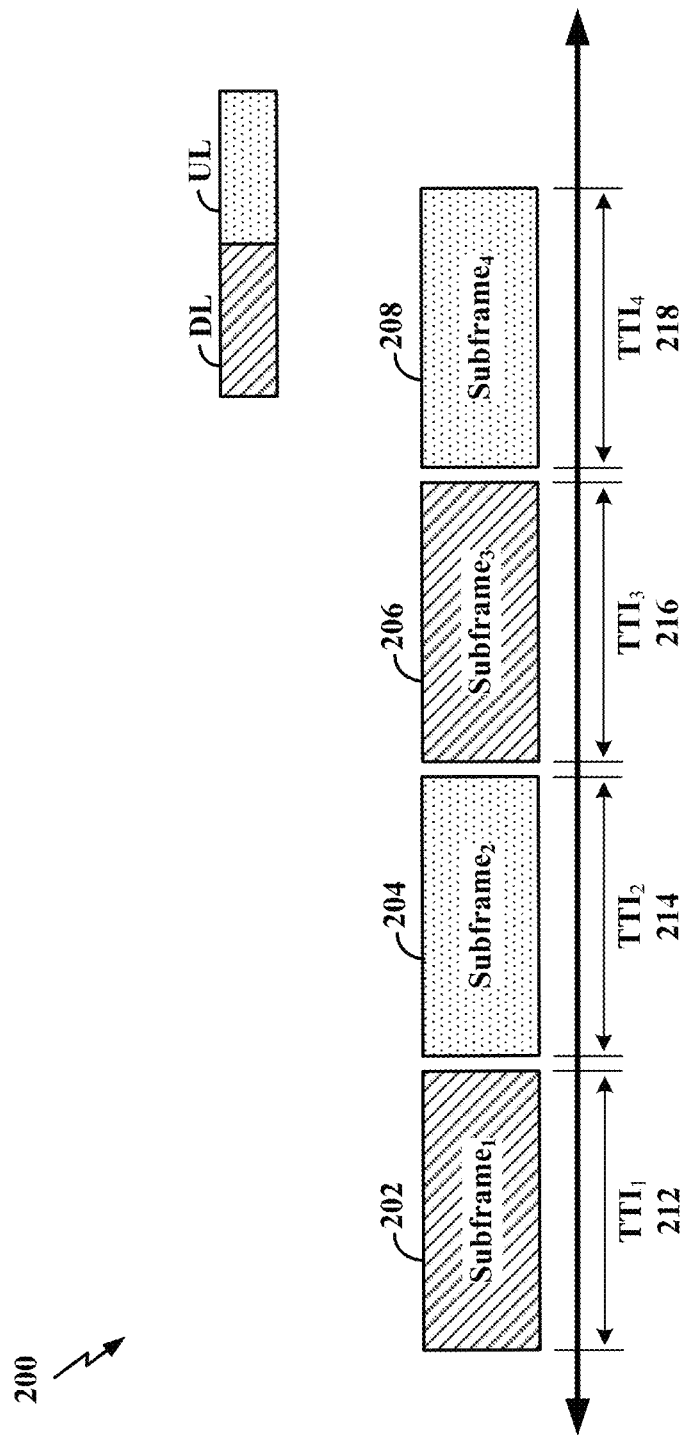
FIG. 2 is a diagram illustrating an example of various subframe configurations according to aspects of some communication systems.

FIG. 2 is a diagram 200 illustrating an example of various subframe configurations according to aspects of some communication systems. Generally, as used within the present disclosure, a frame may refer to an encapsulated set and/or packet of data and/or information. A frame may include a plurality of subframes. Each subframe may include a plurality of symbols. Each subframe may have a particular duration. A transmission time interval (TTI) refers to the duration of a single subframe. Accordingly, a TTI refers to the duration of the aforementioned plurality of symbols in the single subframe. Each symbol may be received and decoded at a receiver. Each symbol may correspond to a single turbo code word that the receiver may understand and decode. In some configurations, a TTI may refer to the smallest granularity of a collection of symbols to be processed at the receiver. One of ordinary skill in the art will understand that the terms 'frame' and/or 'subframe' may be known as or referred to by various other suitable terms without deviating from the scope of the present disclosure.

The subframes illustrated in FIG. 2 may sometimes be referred to as time division duplex (TDD) subframes. For illustrative purposes, four TDD subframes are illustrated in FIG. 2. Subframe$_1$ 202 is a DL communication during TTI$_1$ 212. Subframe$_2$ 204 is an UL communication during TTI$_2$ 214. Subframe$_3$ 206 is a DL communication during TTI$_3$ 216. Subframe$_4$ 208 is an UL communication during TTI$_4$ 218. In some communication systems, subframes may be scheduled as a DL subframe (e.g., Subframe$_1$ 202, Subframe$_3$ 206) or an UL subframe (e.g., Subframe$_2$ 204, Subframe$_4$ 208). Accordingly, DL MiCr data can be communicated in Subframe$_1$ 202 during TTI$_1$ 212 and/or Subframe$_3$ 206 during TTI$_3$ 216, and UL MiCr data can be communicated in Subframe$_2$ 204 during TTI$_2$ 214 and/or Subframe$_4$ 208 during TTI$_4$ 218.

However, in some communication systems, UL MiCr data cannot be communicated in Subframe$_1$ 202 during TTI$_1$ 212 nor in Subframe$_3$ 206 during TTI$_3$, and DL MiCr data cannot be communicated in Subframe$_2$ 204 during TTI$_2$ 214 nor in Subframe$_4$ 208 during TTI$_4$ 218. Accordingly, instead of communicating UL MiCr data in Subframe$_1$ 202 during TTI$_1$ 212 and/or Subframe$_3$ 206 during TTI$_3$, communication of UL MiCr data will be delayed until Subframe$_2$ 204 during TTI$_2$ 214 and/or Subframe$_4$ 208 during TTI$_4$ 218, respectively. Also, instead of communicating DL MiCr data in Subframe$_2$ 204 during TTI$_2$ 214, communication of DL MiCr data will be delayed until Subframe$_3$ 206 during TTI$_3$. Of course, this MiCr data latency can be extended to an even greater duration when multiple consecutive subframes are all in a single direction, and a MiCr packet is to be communicated in the other direction. Such a large latency in communicating MiCr data may adversely affect the communication system and the overall user experience.

Accordingly, one of ordinary skill in the art will readily understand that communication utilizing a TDD carrier may have certain drawbacks. While a device is transmitting a symbol, its receiver is disabled and generally unable to receive a symbol. Similarly, while a device is receiving a symbol, its transmitter is disabled and it is generally unable to transmit a symbol. One approach that attempts to overcome such an issue is to pair two TDD carriers with one another in a way that can enable full duplex communication at certain time slots, as described in greater detail below with reference to FIG. 3.

Figure 3:
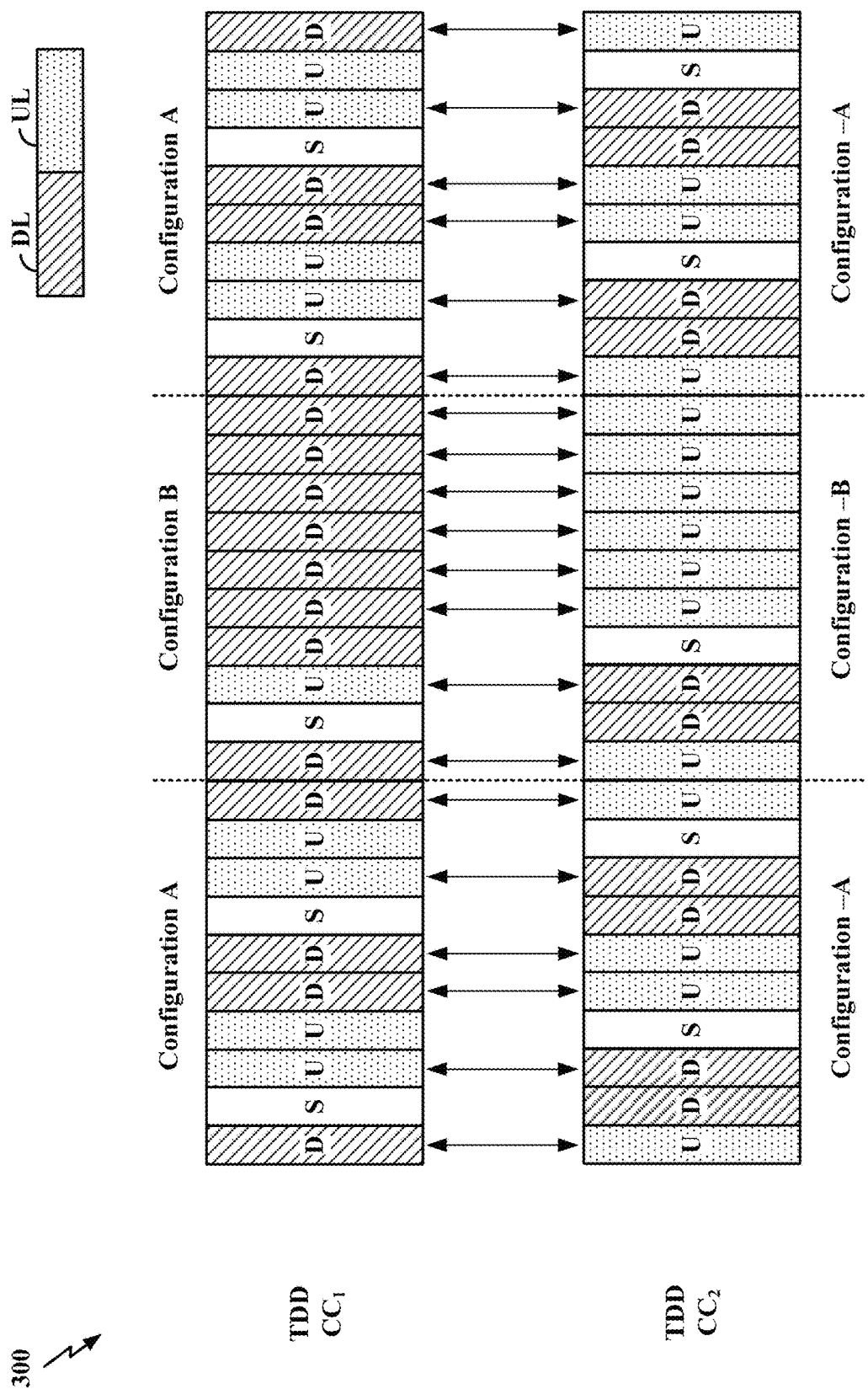
FIG. 3 is a diagram illustrating another example of various subframe configurations according to aspects of some communication systems.

FIG. 3 is a diagram 300 illustrating another example of various subframe configurations according to aspects of some communication systems. More specifically, FIG. 3 illustrates an example of a pairing of two TDD component carriers (CC). A first CC (CC$_1$) is paired with a second CC (CC$_2$). In the diagram 300, the horizontal axis represents time (not to scale), and the vertical axis represents frequency (not to scale). CC$_1$ and CC$_2$ are TDD carriers. Uplink time slots (indicated with a "U") are time-multiplexed with downlink time slots (indicated with a "D") on each respective carrier. Some time slots are special time slots (indicated with an "S"), as described further below. Generally, a time slot may correspond to any suitable duration of time and may correspond to other nomenclature such as a TTI, a subframe, a frame, a symbol, a duration of time, and/or any other suitable term.

As illustrated in diagram 300, the frame configured as "Configuration A" is paired with a frame configured as "Configuration –A", wherein "Configuration –A" represents the inverse (or conjugate) of "Configuration A." Likewise, "Configuration B" frame is paired with a frame configured as "Configuration –B." Here, CC$_2$ may implement an inverse, conjugate, and/or complementary transmit/receive organization relative to that of CC$_1$. The terms inverse, complementary, and/or conjugate may be utilized interchangeably, generally referring to a configuration wherein at least some of the downlink time slots ("D") in CC$_1$ are paired with uplink time slots ("U") in CC$_2$, and at least some of the uplink time slots ("U") in CC$_1$ are paired with downlink time slots ("D") in CC$_2$.

The special time slot ("S") may be utilized for downlink-to-uplink switching. For example, a scheduling entity (e.g., Device$_A$ 102) may utilize these special time slots ("S") as time gaps for a subordinate entity (e.g., Device$_B$ 104) to transition from a downlink time slot ("D") to an uplink time slot ("U") when utilizing a TDD carrier. For example, there may exist a propagation delay between the transmission of the downlink time slot ("D") from the scheduling entity (e.g., Device$_A$ 102) to the subordinate entity (e.g., Device$_B$ 104). To account for such a propagation delay, special time slots ("S") provide a time gap between the end of an downlink time slots ("D") and the beginning of an uplink time slot ("U") such that the scheduling entity (e.g., Device$_A$ 102) and the subordinate entity (e.g., Device$_B$ 104) can maintain synchronization. Here, the time gap may correspond to a time when neither uplink nor downlink communication occurs.

However, switching between downlink time slots ("D") and uplink time slots ("U") may require complex interference management protocols. Also, paired component carriers may not always be available. Even if available, some time slots may not have a conjugate time slot. In other words, as illustrated in FIG. 3, not every downlink time slots ("D") has a conjugate uplink time slots ("U"). For example, time slots in CC$_1$ do not have conjugate time slots in CC$_2$ whenever CC$_2$ has a special time slot ("S"). In other words, whenever CC$_1$ or CC$_2$ has a special time slot ("S"), the communication system does not have the capability to utilize both an uplink time slot ("U") and a downlink time slot ("D") at the same time. As such, the communication system cannot benefit from simultaneous/concurrent UL and DL communications when one of the component carriers is scheduled for a special time slot ("S"). Accordingly, the communication system may have to delay simultaneous/concurrent UL and DL communications until the end of that special time slot ("S"). Such latency in communicating certain types of data (e.g., MiCr) may adversely affect the communication system and the overall user experience.

Figure 4:
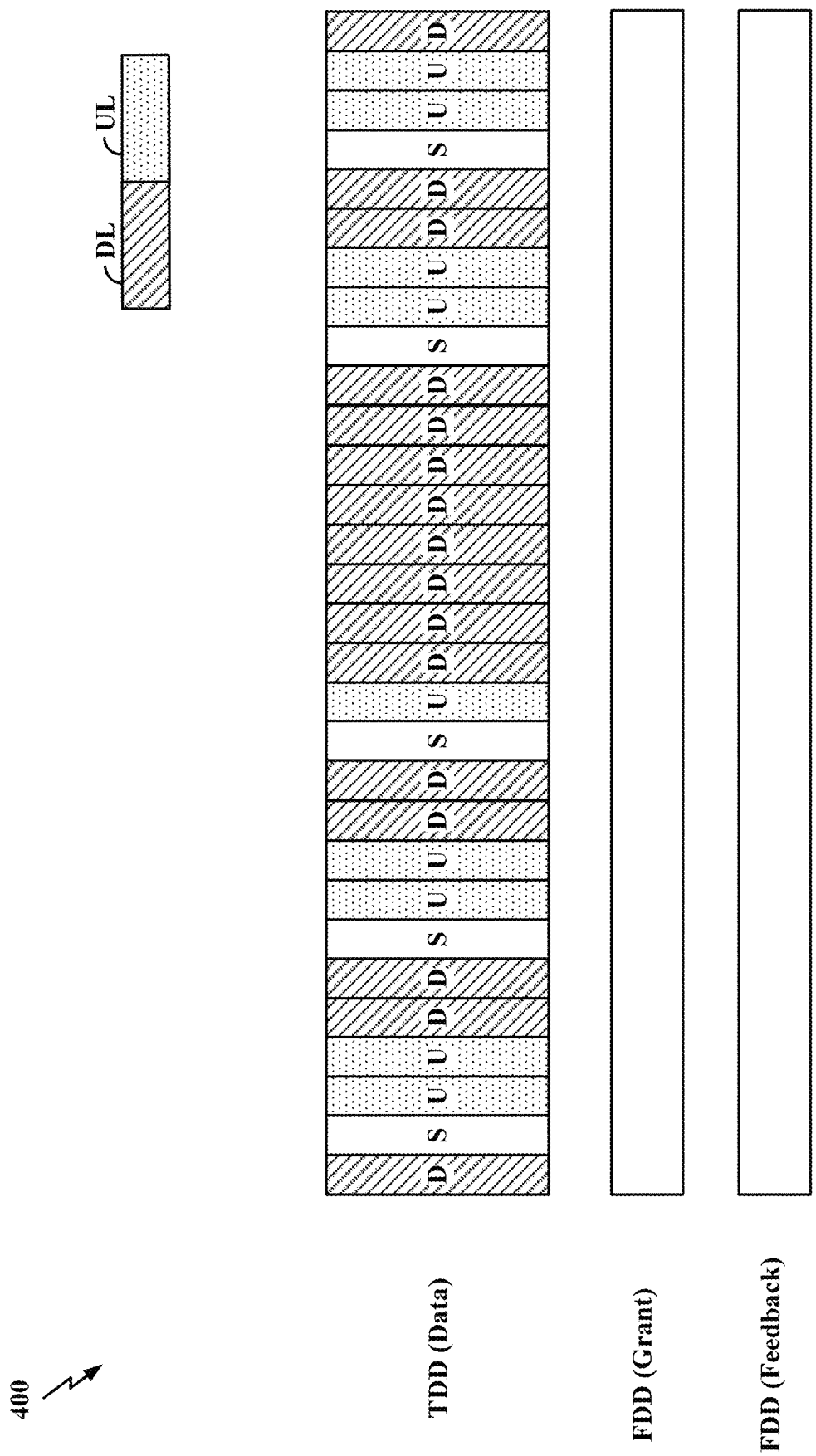
FIG. 4 is a diagram illustrating yet another example of various subframe configurations according to aspects of some communication systems.

FIG. 4 is a diagram 400 illustrating yet another example of various subframe configurations according to aspects of some communication systems. Various aspects of the TDD carriers illustrated in FIG. 4 are similar to aspects of the TDD carriers described above with reference to FIG. 3 and therefore will not be repeated. TDD carriers may be utilized to transmit data from one device to another device. Frequency division duplex (FDD) carriers may be utilized to trigger a switch between downlink time slots ("D") and uplink time slots ("U"). For example, an FDD carrier may indicate that the communication system should switch from a downlink time slot ("D") to an uplink time slot ("U"). An FDD carrier may also be used for communicating feedback. For example, an FDD carrier may be utilized to communicate an acknowledgement message (ACK) or a negative acknowledgement message (NACK).

However, switching between downlink time slots ("D") and uplink time slots ("U") may require complex interference management protocols. Also, the communication system is unable to perform simultaneous/concurrent high bit rate DL and UL communication. In the example illustrated in FIG. 4, the TDD carriers accommodates a single component carrier that can either (i) perform an UL communication during an uplink time slot ("U"), (ii) perform a DL communication during a downlink time slot ("D"), or (iii) transition from a DL communication to an UL communication during a special time slot ("S"). Accordingly, the communication system faces unavoidable delays during special time slots ("S"). The communication system cannot perform a DL communication nor an UL communication during the special time slot ("S"). Accordingly, the communication system may have to delay the UL/DL communication until the end of the special time slot ("S"). Such delays in communicating certain types of data (e.g., MiCr) may adversely affect the communication system and the overall user experience.

The description provided above with reference to FIGS. 2-4 pertains to some communication systems. Generally, such communication systems may introduce delays in the communication of MiCr data in certain circumstances. These circumstances may sometimes be referred to as TDD self-blocking, which can occur (i) when DL MiCr data is blocked from being communicated in the current subframe because the current subframe is an UL communication, and/or (ii) when UL MiCr data is blocked from being communicated in the current subframe because the current subframe is a DL communication. However, aspects of the present disclosure may reduce or eliminate these issues by enabling communication of both UL MiCr data and DL MiCr data in the same, single TDD subframe. Furthermore, aspects of the present disclosure enable such communication without dynamic UL/DL switching, which facilitates interference management and avoids some of the complex interference management protocols of some communication systems, as described above with reference to FIGS. 2-4.

Figure 5:
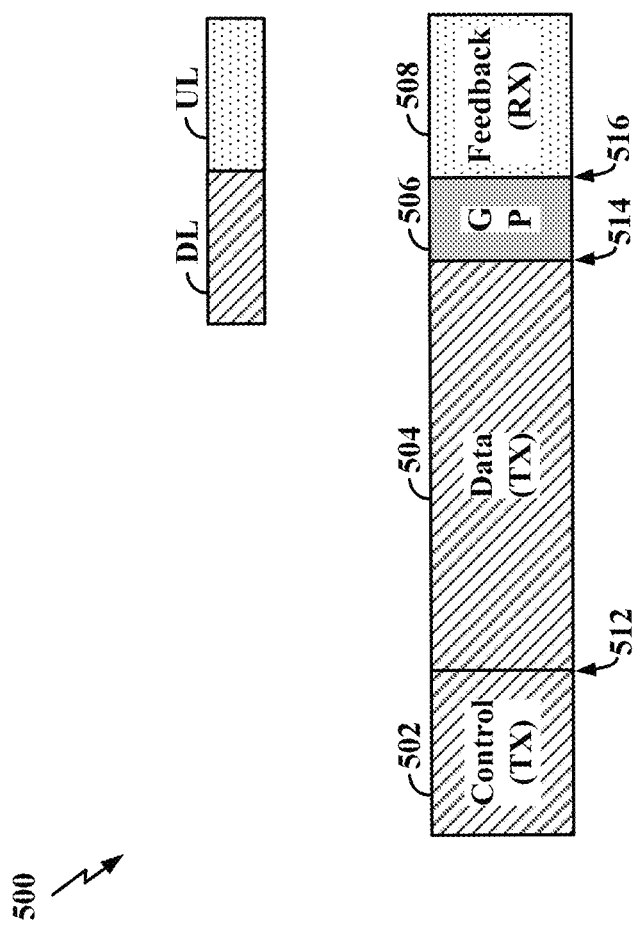
FIG. 5 is a diagram illustrating an example of a DL-centric time division duplex (TDD) subframe according to aspects of the present disclosure.

FIG. 5 is a diagram 500 illustrating an example of a DL-centric TDD subframe according to aspects of the present disclosure. In some examples, such a TDD subframe may be a self-contained TDD subframe. A self-contained TDD subframe may contain control information, data, and acknowledgement information within a single TDD subframe. The control information may include scheduling information. The control/scheduling information may provide control/scheduling for all of the data within that same subframe. The acknowledgement information may include acknowledgement (ACK) or negative acknowledgement (NACK) signals for all of the data within that same subframe. The ACK signal and/or NACK signal may be reserved for all data packets before the next scheduling instance (where the next subframe also includes scheduling for data in that subframe). In some configurations, the acknowledgement information corresponding to certain data in a particular subframe may be included in a different subframe. For example, the ACK/NACK signal corresponding to MiCr data in a first subframe may be included in a second subframe (which may be subsequent to the first subframe).

Additional description pertaining to such a self-contained subframe is provided throughout the present disclosure. The self-contained TDD subframe structure may include transmissions in both the uplink direction as well as the downlink direction. In some examples, the self-contained TDD subframe includes DL control/scheduling information, DL data information corresponding to the scheduling information and UL acknowledgement information corresponding to the data information, as described in greater detail herein. In other examples, the self-contained subframe includes DL control/scheduling information, UL data information corresponding to the scheduling information and DL acknowledgement information corresponding to the data information, as described in greater detail herein. Even if not explicitly referred to as a self-contained subframe, one of ordinary skill in the art will understand that any one or more of the subframes described herein may be configured, implemented, and/or otherwise deployed as a self-contained subframe without deviating from the scope of the present disclosure.

Referring to the example illustrated in FIG. 5, the DL-centric TDD subframe includes a control portion 502. The control portion 502 may include various scheduling information and/or control information corresponding to various portions of the DL-centric TDD subframe. In some configurations, the control portion 502 may be configured for DL communication, as illustrated in FIG. 5. In some configurations, the control portion 502 may be a physical downlink control channel (PDCCH).

The DL-centric TDD subframe may also include a data portion 504. The data portion 504 may sometimes be referred to as the payload of the TDD subframe. The data portion 504 may include various types of information as well as any padding that may be appropriate. In some configurations, the data portion 504 may be configured for DL communication, as illustrated in FIG. 5. In some configurations, MiCr data may be included in the data portion 504. Accordingly, the data portion 504 may enable at least one opportunity to transmit MiCr data. As used herein, the opportunity to transmit MiCr data refers to the availability, option, or possibility to transmit MiCr data during a particular portion of the TDD subframe or during a particular duration of the TTI. Generally, the term 'enabling' (e.g., of an opportunity to transmit and/or to receive) may refer to the activation of relevant circuits, utilization of particular hardware components, and/or execution of corresponding algorithms that allow a particular feature or aspect to exist. Generally, the term 'generating' (e.g., of instructions) may refer to the activation of relevant circuits, the utilization of particular hardware components, and/or execution of corresponding algorithms that cause, trigger, or otherwise lead in the creation, construction, synthesis, development, and/or rendering of certain aspects (e.g., instructions) in accordance with the present disclosure.

The DL-centric TDD subframe may also include a guard period 506. The guard period 506 may sometimes be referred to as a guard interval without deviating from the scope of the present disclosure. Generally, the guard period 506 ensures that distinct transmissions do not interfere with one another. Such interference may include propagation delays, echoes, reflections, and other effects. For example, the guard period 506 may ensure that the DL communication of the data portion 504 (which precedes the guard period 506) does not interfere with the UL communication of the feedback portion 508 (which follows the guard period 506).

In some configurations, the feedback portion 508 may be configured for UL communication, as illustrated in FIG. 5. The feedback portion 508 may be configured for receiving a feedback message from another apparatus. For example, the feedback message may be an ACK or a NACK. In some configurations, the feedback message corresponds to other portions of the TDD subframe. For example, an ACK in the feedback portion 508 may indicate that the MiCr data included in the data portion 504 was successfully transmitted to and received by another apparatus. Furthermore, in some configurations, the feedback portion 508 may enable at least one opportunity to receive MiCr data. As used herein, the opportunity to receive MiCr data refers to the availability, option, or possibility to receive MiCr data during a particular portion of the TDD subframe or during a particular duration of the corresponding TTI. Generally, the term 'enabling' (e.g., of an opportunity to transmit and/or to receive) may refer to the activation of relevant circuits, utilization of particular hardware components, and/or execution of corresponding algorithms that allow a particular feature or aspect to exist.

As described in greater detail above, FIG. 5 illustrates an example of a DL-centric TDD subframe that enables at least one opportunity to transmit MiCr data (e.g., by including MiCr data in the data portion 504 that is transmitted) and at least one opportunity to receive MiCr data (e.g., by including MiCr data in the feedback portion 508 that is received). In many configurations, the DL-centric TDD subframe is included in a single TTI, and the duration of that TTI is no greater than 500 microseconds. By including at least one opportunity to transmit MiCr data and at least one opportunity to receive MiCr data in the same, single TDD subframe, MiCr data can be communicated sooner than it might be otherwise. As described above, some communication systems may introduce delays or increased latency in the communication of MiCr data in certain circumstances. These circumstances may sometimes be referred to as TDD self-blocking, which can occur (i) when DL MiCr data is blocked from being communicated in the current subframe because the current subframe is an UL communication, and/or (ii) when UL MiCr data is blocked from being communicated in the current subframe because the current subframe is a DL communication. However, aspects of the present disclosure may reduce or eliminate these issues by enabling the communication of both UL MiCr data as well DL MiCr data in the same, single TDD subframe.

As illustrated in FIG. 5, the control portion 502 is separated from the data portion 504 by a first partition 512, the data portion 504 is separated from the guard period 506 by a second partition 514, and the guard period 506 is separated from the feedback portion 508 by a third partition 516. As used herein, the term 'partition' may refer to a marker, separation, and/or any other suitable term without deviating from the scope of the present disclosure. In some configurations, one or more of these partitions 512, 514, 516 may be adjusted, altered, optimized, and/or otherwise changed in location and/or position based on various factors. Such factors may include one or more characteristics of the MiCr data. Characteristics of the MiCr data may include the loading of the MiCr data, the amount of MiCr data to be transmitted (e.g., in the data portion 504), the amount of MiCr data to be received (e.g., in the feedback portion 508), and/or various other suitable factors.

Based on one or more characteristics of the MiCr data, one or more of these partitions 512, 514, 516 may be adjusted, altered, optimized, and/or otherwise changed in location and/or position. Accordingly, how much of the TDD subframe is configured for the at least one opportunity to transmit the MiCr data and/or how much of the TDD subframe is configured for the at least one opportunity to receive the MiCr data may be adjusted, altered, optimized, and/or otherwise changed in location and/or position based on one or more characteristics of the MiCr data. As an example, the first partition 512 may be adjusted to the left (e.g., earlier in time) if the amount of DL MiCr data to be included in data portion 504 is greater than the amount of DL MiCr data that would otherwise be accommodated in the data portion 504. As another example, the second partition 514 and the third partition 516 may be adjusted to the left (e.g., earlier in time) if the amount of UL MiCr data to be included in the feedback portion 508 is greater than the amount of MiCr data that would otherwise be accommodated in the feedback portion 508. Accordingly, various portions of the DL-centric subframe can be adjusted to accommodate for one or more characteristics of the MiCr data without adjusting the total size or length of the DL-centric subframe or TTI (e.g., 500 microseconds). One of ordinary skill in the art understands that the example illustrated in FIG. 5 is not intended to limit the scope of the present disclosure and alternative examples of a DL-centric TDD subframe are within the scope of the present disclosure.

Figure 6:
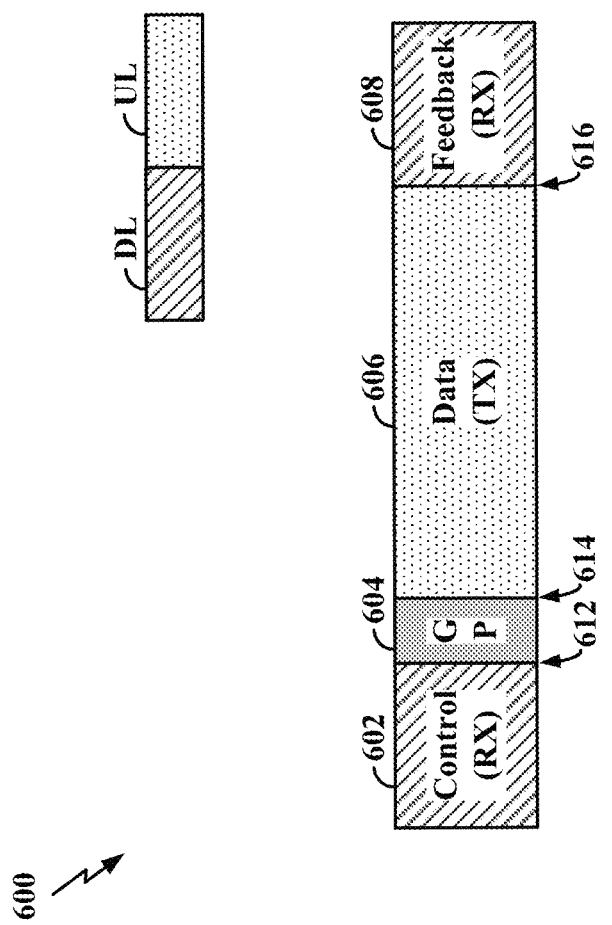
FIG. 6 is a diagram illustrating an example of an UL-centric TDD subframe according to aspects of the present disclosure.

FIG. 6 is a diagram 600 illustrating an example of an UL-centric TDD subframe according to aspects of the present disclosure. In this example, the UL-centric TDD subframe includes a control portion 602. The control portion 602 may include various scheduling information and/or control information corresponding to various portions of the UL-centric TDD subframe. In some configurations, the control portion 602 may be configured for DL communication, as illustrated in FIG. 6. In some configurations, the control portion 602 may be a PDCCH. In some configurations, MiCr data may be included in the control portion 602. Accordingly, the control portion 602 may enable at least one opportunity to receive MiCr data. As used herein, the opportunity to receive MiCr data refers to the availability, option, or possibility to receive MiCr data during a particular portion of the TDD subframe or during a particular duration of the corresponding TTI. Generally, the term 'enabling' (e.g., of an opportunity to transmit and/or to receive) may refer to the activation of relevant circuits, utilization of particular hardware components, and/or execution of corresponding algorithms that allow a particular feature or aspect to exist.

The UL-centric TDD subframe may also include a guard period 604. The guard period 604 may sometimes be referred to as a guard interval without deviating from the scope of the present disclosure. Generally, the guard period 604 ensures that distinct transmissions do not interfere with one another. Such interference may include propagation delays, echoes, reflections, and other effects. For example, the guard period 604 may ensure that the DL communication of the control portion 602 (which precedes the guard period 604) does not interfere with the UL communication of the data portion 606 (which follows the guard period 604).

The data portion 606 may sometimes be referred to as the payload of the TDD subframe. The data portion 606 may include various types of information (e.g., data, scheduling resources for future transmissions, etc.) as well as any padding that may be appropriate. In some configurations, the data portion 606 may be configured for UL communication, as illustrated in FIG. 6. In some configurations, the data portion 606 may include MiCr data. Accordingly, the data portion 606 may enable at least one opportunity to transmit MiCr data. As used herein, the opportunity to transmit MiCr data refers to the availability, option, or possibility to receive MiCr data during a particular portion of the TDD subframe or during a particular duration of the corresponding TTI. Generally, the term 'enabling' (e.g., of an opportunity to transmit and/or to receive) may refer to the activation of relevant circuits, utilization of particular hardware components, and/or execution of corresponding algorithms that allow a particular feature or aspect to exist.

The UL-centric TDD subframe may also include a feedback portion 608 that follows the data portion 606. In some configurations, the feedback portion 608 may be configured for DL communication, as illustrated in FIG. 6. The feedback portion 608 may be configured for receiving a feedback message from another apparatus. For example, the feedback message may be an ACK or a NACK. In some configurations, the feedback message corresponds to other portions of the TDD subframe. For example, an ACK in the feedback portion 608 may indicate that the MiCr data included in the data portion 606 was successfully transmitted to and received by another apparatus. Furthermore, in some configurations, the feedback portion 608 may include MiCr data. Accordingly, the feedback portion 608 may enable at least one additional opportunity to receive MiCr data. (As described above, the control portion 602 also enables at least one opportunity to receive MiCr data.)

As described in greater detail above, FIG. 6 illustrates an example of an UL-centric TDD subframe that enables at least one opportunity to receive MiCr data (e.g., by including MiCr data in the control portion 602 and/or the feedback portion 608 that is/are received) and at least one opportunity to transmit MiCr data (e.g., by including MiCr data in the data portion 606 that is transmitted). In many configurations, the UL-centric TDD subframe is included in a single TTI, and the duration of that TTI is no greater than 500 microseconds. By including at least one opportunity to receive MiCr data and at least one opportunity to transmit MiCr data in the same, single TDD subframe, MiCr data can be communicated sooner than it might be otherwise. As described above, some communication systems may introduce delays in the communication of MiCr data in certain circumstances. These circumstances may sometimes be referred to as TDD self-blocking, which can occur (i) when DL MiCr data is blocked from being communicated in the current subframe because the current subframe is an UL communication, and/or (ii) when UL MiCr data is blocked from being communicated in the current subframe because the current subframe is a DL communication. However, aspects of the present disclosure overcome such limitations by enabling the communication of both UL MiCr data as well DL MiCr data in the same, single TDD subframe.

As illustrated in FIG. 6, the control portion 602 is separated from the guard period 604 by a first partition 612, the guard period 604 is separated from the data portion 606 by a second partition 614, and the data portion 606 is separated from the feedback portion 608 by a third partition 616. In some configurations, one or more of these partitions 612, 614, 616 may be adjusted, altered, optimized, and/or otherwise changed in location and/or position based on various factors. Such factors may include one or more characteristics of the MiCr data. Characteristics of the MiCr data may include the loading of the MiCr data, the amount of MiCr data to be transmitted (e.g., in the data portion 606), the amount of MiCr data to be received (e.g., in the control portion 602 and/or the feedback portion 608), and/or various other suitable factors.

Based on one or more characteristics of the MiCr data, one or more of these partitions 612, 614, 616 may be adjusted, altered, optimized, and/or otherwise changed in location and/or position. Accordingly, how much of the TDD subframe is configured for the at least one opportunity to transmit the MiCr data and/or how much of the TDD subframe is configured for the at least one opportunity to receive the MiCr data may be adjusted, altered, optimized, and/or otherwise changed in location and/or position based on one or more characteristics of the MiCr data. As an example, the first partition 612 and the second partition 614 may be adjusted to the right (e.g., later in time) if the amount of DL MiCr data to be included in the control portion 602 is greater than the amount of DL MiCr data that would otherwise be accommodated in the control portion 602. As another example, the third partition 516 may be adjusted to the left (e.g., earlier in time) if the amount of DL MiCr data to be included in the feedback portion 608 is greater than the amount of DL MiCr data that would otherwise be accommodated in the feedback portion 608. Accordingly, various portions of the UL-centric subframe can be adjusted to accommodate for one or more characteristics of the MiCr data without adjusting the total size or length of the UL-centric subframe or TTI (e.g., 500 microseconds). One of ordinary skill in the art understands that the example illustrated in FIG. 6 is not intended to limit the scope of the present disclosure and alternative examples of a UL-centric TDD subframe are within the scope of the present disclosure.

Figure 7:
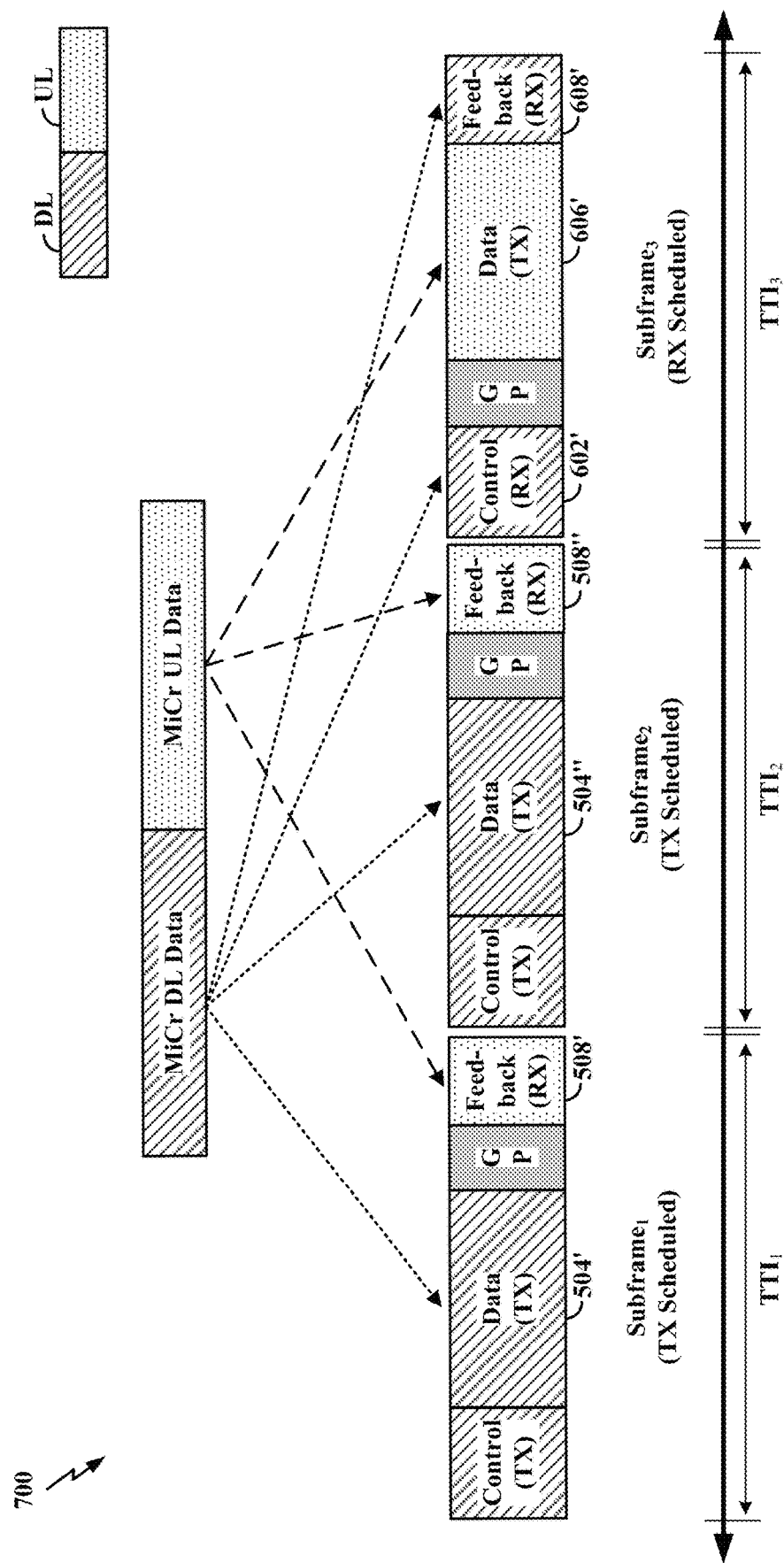
FIG. 7 is a diagram illustrating an example of various communications according to aspects of the present disclosure.

FIG. 7 is a diagram 700 illustrating an example of various communications according to aspects of the present disclosure. In this diagram 700, three subframes (Subframe$_1$, Subframe$_2$, Subframe$_3$) are shown for three TTIs (TTI$_1$, TTI$_2$, TTI$_3$, respectively). Subframe$_1$ and Subframe$_2$ are DL-centric TDD subframes, as described in greater detail above with reference to FIG. 5. Subframe$_3$ is an UL-centric TDD subframe, as described in greater detail above with reference to FIG. 6. During each TTI, there exists at least one opportunity to transmit MiCr data and at least one opportunity to receive MiCr data. For example, during TTI$_1$, MiCr data may be included in the data portion 504' of Subframe$_1$ (thus enabling at least one opportunity to transmit MiCr data), and MiCr data may be included in the feedback portion 508' of Subframe$_1$ (thus enabling at least one opportunity to receive MiCr data). As another example, during TTI$_2$, MiCr data may be included in the data portion 504" of Subframe$_2$ (thus enabling at least one opportunity to transmit MiCr data), and MiCr data may be included in the feedback portion 508" of Subframe$_2$ (thus enabling at least one opportunity to receive MiCr data). As yet another example, during TTI$_3$, MiCr data may be included in the control portion 602' of Subframe$_3$ (thus enabling a first opportunity of at least one opportunity to receive MiCr data), MiCr data may be included in the data portion 606' of Subframe$_3$ (thus enabling at least one opportunity to transmit MiCr data), and MiCr data may be included in the feedback portion 608' (thus enabling a second opportunity of at least one opportunity to receive MiCr data).

One of ordinary skill in the art understands that the TDD spectrum cannot necessarily be considered an 'always on' resource for the communication system. As such, certain TDD carriers may sometimes be unavailable to the communication system. However, the FDD spectrum may be considered an 'always on' resource for the communication system. In some configurations, the feedback message (e.g., ACK/NACK) may be communicated using an FDD carrier. This may be done because (i) the FDD is regularly available to the communication system, and/or (ii) the feedback portions (e.g., feedback portions 508', 508", 608') of the TDD subframe may be occupied with MiCr data. Accordingly, in some configurations, an FDD carrier may be utilized for communication of a feedback message corresponding to MiCr data. Also, in some configurations, an FDD carrier may be utilized for retransmission (e.g., hybrid automatic repeat request (HARM) retransmission) of the MiCr data. In some configurations, the feedback message (e.g., ACK/NACK) may be communicated using a paired TDD carrier. In such configurations, the paired TDD carrier may be utilized for communication of a feedback message corresponding to MiCr data and/or for retransmission (e.g., HARQ retransmission) of the MiCr data.

The communication system may determine how frequently to utilize an UL-centered TDD subframe and/or a DL-centered TDD subframe according to various factors without deviating from the scope of the present disclosure. In some configurations, the communication system may determine how frequently to utilize an UL-centered TDD subframe and/or a DL-centered TDD subframe according to predetermined settings set by the network. Accordingly, the proportion, number, ratio, and/or percentage of UL-centered TDD subframes relative to DL-centered TDD subframes may be determined according to such predetermined settings set by the network. In some configurations, the communication system may determine how frequently to utilize an UL-centered TDD subframe and/or a DL-centered TDD subframe according to settings that are dynamically or semi-statically adjusted based on various traffic or network conditions. For instance, if current traffic or network conditions indicate a relatively high proportion, number, ratio, and/or percentage of UL data (e.g., UL MiCr data), then the communication system may utilize a greater proportion, number, ratio, and/or percentage of UL-centric subframes relative to the proportion, number, ratio, and/or percentage of DL-centric subframes. Conversely, if current traffic or network conditions indicate a relatively high proportion, number, ratio, and/or percentage of DL data (e.g., DL MiCr data), then the communication system may utilize a greater proportion, number, ratio, and/or percentage of DL-centric subframes relative to the proportion, number, ratio, and/or percentage of UL-centric subframes.

Figure 8:
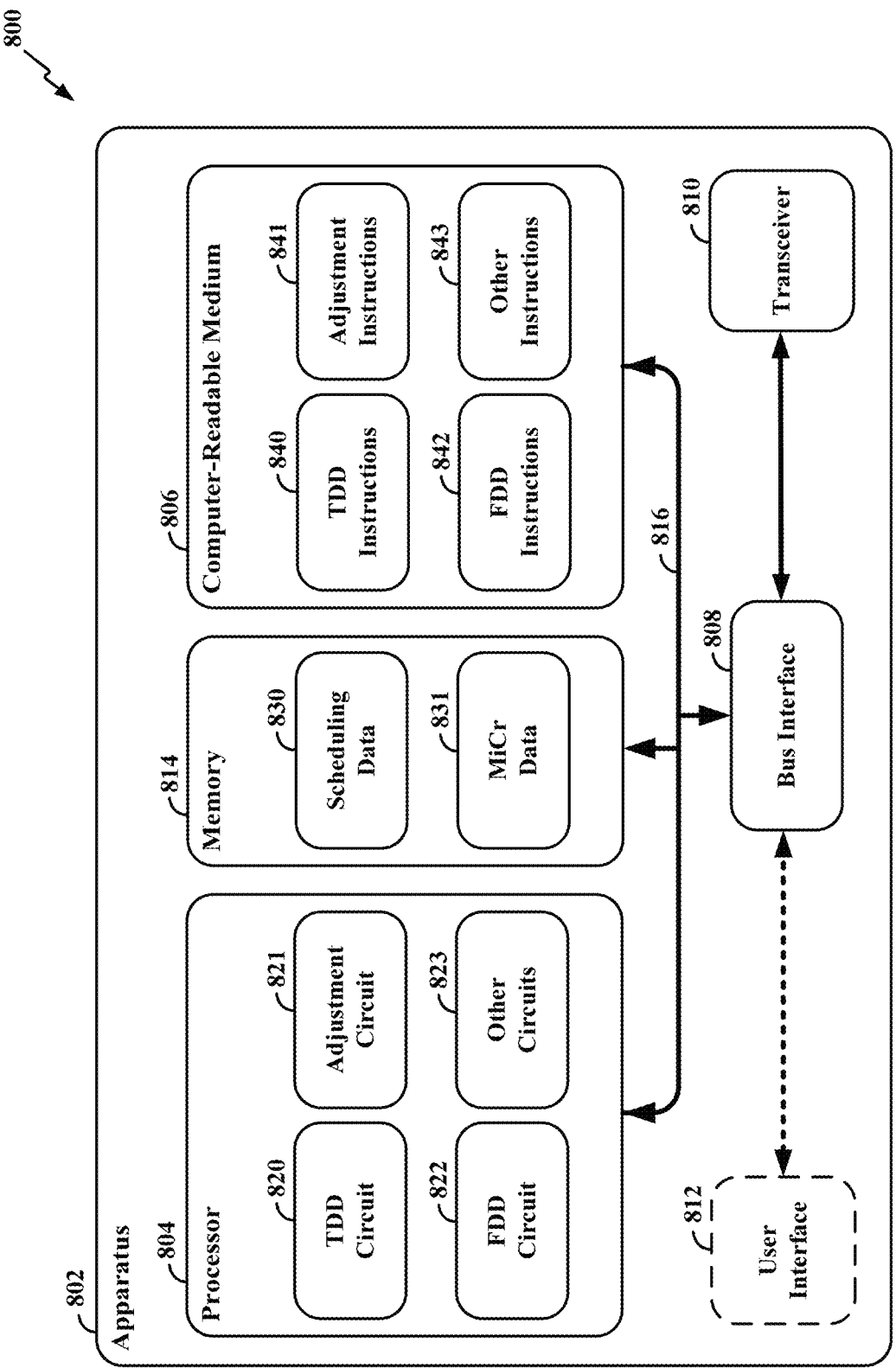
FIG. 8 is a diagram illustrating an example of a hardware implementation of an apparatus according to various aspects of the present disclosure.

FIG. 8 is a diagram 800 illustrating an example of a hardware implementation of an apparatus 802 according to various aspects of the present disclosure. Generally, the apparatus 802 may be any device configured for wireless communication. In some configurations, the apparatus 802 may be Device$_A$ 102, as described in greater detail above. In some configurations, the apparatus 802 may be Device$_B$ 104, as described in greater detail above. The apparatus 802 may include a user interface 812. The user interface 812 may be configured to receive one or more inputs from a user of the apparatus 802. The user interface 812 may also be configured to display information to the user of the apparatus 802. The user interface 812 may exchange data via the bus interface 808.

The apparatus 802 may also include a transceiver 810. The transceiver 810 may be configured to receive data and/or transmit data in communication with another apparatus. The transceiver 810 provides a means for communicating with another apparatus via a wired or wireless transmission medium. In some configurations, the transceiver 810 may provide the means for communicating MiCr data in a TDD subframe during a single TTI. According to aspects of the present disclosure, the term(s) 'communicate' and/or 'communicating' refer to at least one of a transmission or a reception. In other words, without deviating from the scope of the present disclosure, the term(s) 'communicate' and/or 'communicating' may refer to a transmission without a simultaneous/concurrent reception, a reception without a simultaneous/concurrent transmission, and/or a transmission with a simultaneous/concurrent reception.

In some examples, the transceiver 810 may provide Device$_A$ 102 with the means for transmitting data (e.g., MiCr data) to Device$_B$ 104 as well as the means for receiving data (e.g., MiCr data) from Device$_B$ 104 (e.g., in a TDD subframe during a single TTI). In some other examples, the transceiver 810 may provide Device$_B$ 104 with the means for transmitting data (e.g., MiCr data) to Device$_A$ 102 as well as the means for receiving data (e.g., MiCr data) from Device$_A$ 102 (e.g., in a TDD subframe during a single TTI). The transceiver 810 may be configured to perform such communications using various types of technologies, as described in greater detail above. One of ordinary skill in the art will understand that many types of technologies may perform such communication without deviating from the scope of the present disclosure.

The apparatus 802 may also include a memory 814, one or more processors 804, a computer-readable medium 806, and a bus interface 808. The bus interface 808 may provide an interface between a bus 816 and the transceiver 810. The memory 814, the one or more processors 804, the computer-readable medium 806, and the bus interface 808 may be connected together via the bus 816. The processor 804 may be communicatively coupled to the transceiver 810 and/or the memory 814.

The processor 804 may include a TDD circuit 820. The TDD circuit 820 may include various hardware components and/or may perform various algorithms that provide the means for enabling at least one opportunity to transmit MiCr data and at least one opportunity to receive the MiCr data in a TDD subframe during a single TTI. The TDD circuit 820 may also include various hardware components and/or may perform various algorithms that provide the means for communicating the MiCr data in the TDD subframe during the single TTI.

The processor 804 may also include an adjustment circuit 821. The adjustment circuit 821 may include various hardware components and/or may perform various algorithms that provide the means for adjusting how much of the TDD subframe is configured for the at least one opportunity to transmit the MiCr data and how much of the TDD subframe is configured for the at least one opportunity to receive the MiCr data based on one or more characteristics of the MiCr data. The processor 804 may also include an FDD circuit 822. The FDD circuit 822 may include various hardware components and/or may perform various algorithms that provide the means for utilizing an FDD carrier for communication of a feedback message corresponding to the MiCr data. The FDD circuit 822 may also include various hardware components and/or may perform various algorithms that provide the means for utilizing an FDD carrier for retransmission of the MiCr data. The foregoing description provides a non-limiting example of the processor 804 of the apparatus 802. Although various circuits 820, 821, 822 are described above, one of ordinary skill in the art will understand that the processor 804 may also include various other circuits 823 that are in addition and/or alternative(s) to the aforementioned circuits 820, 821, 822. Such other circuits 823 may provide the means for performing any one or more of the functions, methods, processes, features and/or aspects described herein.

The computer-readable medium 806 may include various computer-executable instructions. The computer-executable instructions may include computer-executable code configured to perform various functions and/or enable various aspects described herein. The computer-executable instructions may be executed by various hardware components (e.g., the processor 804 and/or any of its circuits 820, 821, 822, 823) of the apparatus 802. The computer-executable instructions may be a part of various software programs and/or software modules. The computer-readable medium 806 may include TDD instructions 840. The TDD instructions 840 may include computer-executable instructions configured for enabling at least one opportunity to transmit MiCr data and at least one opportunity to receive the MiCr data in a TDD subframe during a single TTI. The TDD instructions 840 may also include computer-executable instructions configured for communicating the MiCr data in the TDD subframe during the single TTI.

The computer-readable medium 806 may also include adjustment instructions 841. The adjustment instructions 841 may include computer-executable instructions configured for adjusting how much of the TDD subframe is configured for the at least one opportunity to transmit the MiCr data and how much of the TDD subframe is configured for the at least one opportunity to receive the MiCr data based on one or more characteristics of the MiCr data. The computer-readable medium 806 may include FDD instructions 842. The FDD instructions 842 may include computer-executable instructions configured for utilizing an FDD carrier for communication of a feedback message corresponding to the MiCr data. The FDD instructions 842 may also include computer-executable instructions configured for utilizing an FDD carrier for retransmission of the MiCr data. The foregoing description provides a non-limiting example of the computer-readable medium 806 of the apparatus 802. Although various computer-executable instructions 840, 841, 842 are described above, one of ordinary skill in the art will understand that the computer-readable medium 806 may also include various other computer-executable instructions 843 that are in addition and/or alternative(s) to the aforementioned computer-executable instructions 840, 841, 842. Such other computer-executable instructions 843 may be configured for any one or more of the functions, methods, processes, features and/or aspects described herein.

The memory 814 may include various memory modules. The memory modules may be configured to store, and have read therefrom, various values and/or information by the processor 804, or any of its circuits 820, 821, 822, 823. The memory modules may also be configured to store, and have read therefrom, various values and/or information upon execution of the computer-executable code included in the computer-readable medium 806, or any of its instructions 840, 841, 842, 843. The memory 814 may include scheduling data 830. The scheduling data 830 may include at least some of the information included in one or more of the control portions 502, 502', 502", 602, 602' described herein. The memory may also include MiCr data 831. The MiCr data 831 may include at least some of the MiCr data that may be included in one or more of the control portions 602, 602', data portions 504, 504', 504", 604, 604', and/or feedback portions 508, 508', 508", 608, 608' described herein. The foregoing description provides a non-limiting example of the memory 814 of the apparatus 802. Although various types of data of the memory 814 are described above, one of ordinary skill in the art will understand that the memory 814 may also include various other data that are in addition and/or alternative(s) to the aforementioned data 830, 831. Such other data may be associated with any one or more of the functions, methods, processes, features and/or aspects described herein.

One of ordinary skill in the art will also understand that the apparatus 802 may include alternative and/or additional features without deviating from the scope of the present disclosure. In accordance with various aspects of the present disclosure, an element, or any portion of an element, or any combination of elements may be implemented with a processing system that includes one or more processors 804. Examples of the one or more processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processing system may be implemented with a bus architecture, represented generally by the bus 816 and bus interface 808. The bus 816 may include any number of interconnecting buses and bridges depending on the specific application of the processing system and the overall design constraints. The bus 816 may link together various circuits including the one or more processors 804, the memory 814, and the computer-readable medium 806. The bus 816 may also link various other circuits such as timing sources, peripherals, voltage regulators, and power management circuits, which are well known in the art.

The one or more processors 804 may be responsible for managing the bus 816 and general processing, including the execution of software stored on the computer-readable medium 806. The software, when executed by the one or more processors 804, causes the processing system to perform the various functions described below for any one or more apparatuses. The computer-readable medium 806 may also be used for storing data that is manipulated by the one or more processors 804 when executing software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 806.

The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 806 may also include, by way of example, a carrier wave, a transmission line, and any other suitable medium for transmitting software and/or instructions that may be accessed and read by a computer. The computer-readable medium 806 may reside in the processing system, external to the processing system, or distributed across multiple entities including the processing system. The computer-readable medium 806 may be embodied in a computer program product. By way of example and not limitation, a computer program product may include a computer-readable medium in packaging materials. Those skilled in the art will recognize how best to implement the described functionality presented throughout this disclosure depending on the particular application and the overall design constraints imposed on the overall system.

Figure 9:
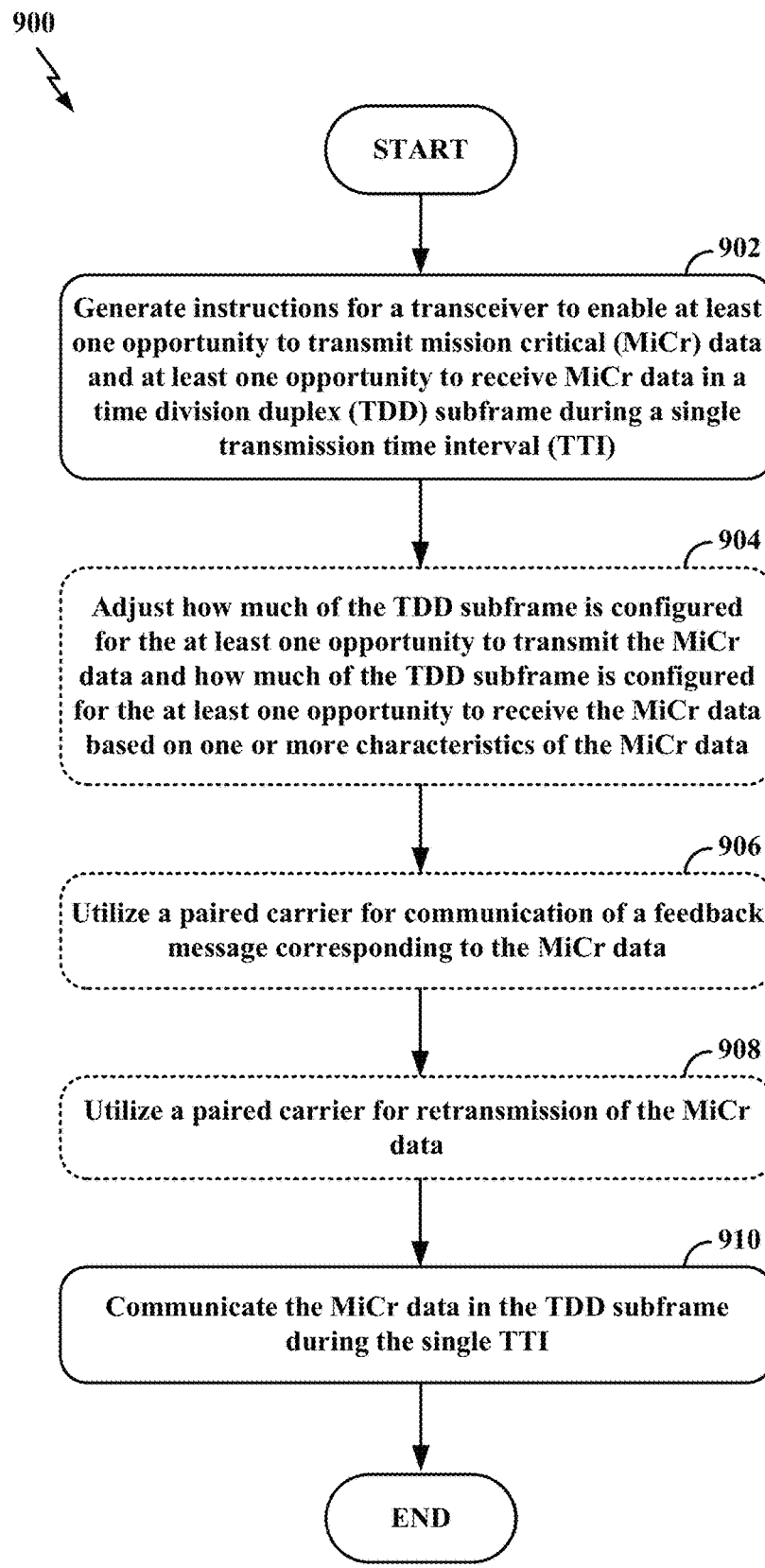
FIG. 9 is a diagram illustrating an example of various methods and/or processes according to aspects of the present disclosure.

FIG. 9 is a diagram 900 illustrating an example of various methods and/or processes according to aspects of the present disclosure. The methods and/or processes may be performed by an apparatus. In some configurations, such an apparatus is the apparatus 802 described above with reference to FIG. 8. In some configurations, such an apparatus is Device$_A$ 102 (described above). In some configurations, such an apparatus is Device$_B$ 104 (described above). At block 902, the apparatus (e.g., apparatus 802, Device$_A$ 102, Device$_B$ 104) may generate instructions for a transceiver to enable at least one opportunity to transmit MiCr data and at least one opportunity to receive the MiCr data in a TDD subframe during a single TTI. For example, referring to FIG. 7, during TTI$_1$, MiCr data may be included in the data portion 504' of Subframe$_1$ (thus enabling at least one opportunity to transmit MiCr data), and MiCr data may be included in the feedback portion 508' of Subframe$_1$ (thus enabling at least one opportunity to receive MiCr data). During TTI$_2$, MiCr data may be included in the data portion 504" of Subframe$_2$ (thus enabling at least one opportunity to transmit MiCr data), and MiCr data may be included in the feedback portion 508" of Subframe$_2$ (thus enabling at least one opportunity to receive MiCr data). During TTI$_3$, MiCr data may be included in the control portion 602' of Subframe$_3$ (thus enabling a first opportunity of at least one opportunity to receive MiCr data), MiCr data may be included in the data portion 606' of Subframe$_3$ (thus enabling at least one opportunity to transmit MiCr data), and MiCr data may be included in the feedback portion 608' (thus enabling a second opportunity of at least one opportunity to receive MiCr data).

In some configurations, at block 904, the apparatus (e.g., apparatus 802, Device$_A$ 102, Device$_B$ 104) adjusts how much of the TDD subframe is configured for the at least one opportunity to transmit the MiCr data and how much of the TDD subframe is configured for the at least one opportunity to receive the MiCr data based on one or more characteristics of the MiCr data. For example, one or more of the partitions 512, 514, 516 in FIG. 5 and/or one or more of the partitions 612, 614, 616 may be adjusted, altered, optimized, and/or otherwise changed in location and/or position based one or more characteristics of the MiCr data. Characteristics of the MiCr data may include the loading of the MiCr data, the amount of MiCr data to be transmitted, the amount of MiCr data to be received, and/or various other suitable factors.

In some configurations, at block 906, the apparatus (e.g., apparatus 802, Device$_A$ 102, Device$_B$ 104) utilizes a paired carried (e.g., an FDD carrier or a paired TDD carrier) for communication of a feedback message corresponding to the MiCr data. Because MiCr data may be included in at least some of the feedback portions (e.g., feedback portions 508', 508", 608' in FIG. 7), the feedback message (e.g., ACK/NACK) may be communicated using an FDD carrier or a TDD carrier. In some configurations, at block 908, the apparatus may utilize a paired carried (e.g., an FDD carrier or a paired TDD carrier) for retransmission of the MiCr data.

For example, if the feedback message (corresponding to the MiCr data transmission) is a NACK, then an FDD carrier or a paired TDD carrier may be utilized for HARQ retransmission of that MiCr data. In some configurations, the apparatus (e.g., apparatus 802, Device$_A$ 102, Device$_B$ 104) transmits the MiCr data in the TDD subframe and receives the MiCr data in the TDD subframe during the same, single TTI. As described in greater detail above, such a TDD subframe may be considered a self-contained TDD subframe. Examples of such subframes are described above with reference to FIGS. 5-7, for example, and therefore will not be repeated. At block 910, the apparatus may communicate the MiCr data in the TDD subframe during the single TTI.

The methods and/or processes described with reference to FIG. 9 are provided for illustrative purposes and are not intended to limit the scope of the present disclosure. The methods and/or processes described with reference to FIG. 9 may be performed in sequences different from those illustrated therein without deviating from the scope of the present disclosure. Additionally, some or all of the methods and/or processes described with reference to FIG. 9 may be performed individually and/or together without deviating from the scope of the present disclosure. It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The above description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

The invention claimed is:

1. An apparatus for wireless communication, the apparatus comprising:
a transceiver;
a memory configured to store instructions; and
at least one processor communicatively coupled to the transceiver and the memory, wherein the at least one processor is configured to execute the instructions to cause the apparatus to:
enable at least one opportunity to transmit a first data in a data portion of a time division duplex (TDD) subframe and at least one opportunity to receive a second data in an uplink portion of the TDD subframe during a transmission time interval (TTI), the second data being different from acknowledgment information corresponding to the first data; and
communicate, via the transceiver during the TTI, utilizing a frequency division duplex (FDD) carrier, the acknowledgment information corresponding to the first data.

2. The apparatus of claim 1, wherein the acknowledgment information indicates that the first data in the data portion of the TDD subframe was successfully transmitted to and received by another apparatus.

3. The apparatus of claim 1, wherein the TDD subframe includes scheduling information corresponding to at least one of the first data or the second data, the scheduling information in a control portion of the TDD subframe.

4. The apparatus of claim 1, wherein the first data or the second data comprises data having at least one of a latency requirement lower than a latency requirement of other data included in the TDD subframe, a priority requirement higher than a priority requirement of other data included in the TDD subframe, or a reliability requirement higher than a reliability requirement of other data included in the TDD subframe.

5. A method for wireless communication, the method comprising:
enabling at least one opportunity to transmit a first data in a data portion of a time division duplex (TDD) subframe and at least one opportunity to receive a second data in an uplink portion of the TDD subframe, during a single transmission time interval (TTI), the second data being different from acknowledgment information corresponding to the first data; and
communicating, via a frequency division duplex (FDD) carrier, during the TTI, information corresponding to the first data.

6. The method of claim 5, wherein the acknowledgment information indicates that the first data in the data portion of the TDD subframe was successfully transmitted to and received by another apparatus.

7. The method of claim 5, wherein the TDD subframe includes scheduling information corresponding to at least one of the first data or the second data, the scheduling information being in a control portion of the TDD subframe.

8. The method of claim 5, wherein the first data or the second data comprises data having at least one of a latency requirement lower than a latency requirement of other data included in the TDD subframe, a priority requirement higher than a priority requirement of other data included in the TDD subframe, or a reliability requirement higher than a reliability requirement of other data included in the TDD subframe.

9. An apparatus for wireless communication, the apparatus comprising:
a transceiver;
a memory configured to store instructions; and
at least one processor communicatively coupled to the transceiver and the memory, wherein the at least one processor and the memory are configured to execute the instructions to cause the apparatus to:
transmit, via the transceiver, a first data utilizing a first frequency division duplex (FDD) carrier; and
receive, via the transceiver, acknowledgment information corresponding to the first data via a time division duplex (TDD) carrier or a second frequency division duplex (FDD) carrier,
wherein the transmission of the first data utilizing the first FDD carrier is a retransmission of the first data after the first data is transmitted in a data portion of a TDD subframe and a second data is received in a feedback portion of the TDD subframe.

10. A wireless communication method, comprising:
enabling at least one opportunity to transmit a first data in a data portion of a time division duplex (TDD) subframe and at least one opportunity to receive a second data in an uplink portion of the TDD subframe, during a single transmission time interval (TTI), the second data being different from acknowledgment information corresponding to the first data; and
communicating, during the single TTI, the acknowledgment information corresponding to the first data via a frequency division duplex (FDD) carrier.

11. The method of claim 10, further comprising transmitting the first data utilizing the FDD carrier as a retransmission of the first data after the first data transmission on the TDD carrier.

12. An apparatus for wireless communication, the apparatus comprising:
a memory; and
at least one processor communicatively coupled to the memory, wherein the at least one processor is configured to:
transmit a first data in a data portion of a time division duplex (TDD) subframe during a transmission time interval (TTI);
receive a second data in an uplink portion of the TDD subframe during the TTI, the second data being different from acknowledgment information corresponding to the first data; and
utilize a frequency division duplex (FDD) carrier to communicate, during the TTI, the acknowledgment information corresponding to the first data.

13. The apparatus of claim 12, wherein the acknowledgment information indicates that the first data in the data portion of the TDD subframe was successfully transmitted to and received by another apparatus.

14. The apparatus of claim 12, wherein the at least one processor is further configured to:
transmit or receive scheduling information in a control portion of the TDD subframe, the scheduling information corresponding to at least one of the first data or the second data.

15. The apparatus of claim 14, wherein the control portion comprises a physical downlink control channel (PDCCH).

16. The apparatus of claim 12, wherein the data portion is for a downlink communication or an uplink communication.

17. The apparatus of claim 16, wherein in response to the data portion for the downlink communication, a first guard period follows the data portion in time in the TDD subframe to prevent the downlink communication of the data portion from interfering with an uplink communication of the feedback portion, and wherein in response to the data portion for the uplink communication, the data portion follows a second guard period to prevent a downlink communication of a control portion from interfering with the uplink communication of the data portion.

18. The apparatus of claim 12, wherein the first data or the second data comprises data having at least one of a latency requirement lower than a latency requirement of other data included in the TDD subframe, a priority requirement higher than a priority requirement of other data included in the TDD subframe, or a reliability requirement higher than a reliability requirement of other data included in the TDD subframe.

19. The apparatus of claim 12, wherein the at least one processor is further configured to:
   transmit the first data utilizing the FDD carrier as a retransmission of the first data after the first data transmission on the TDD carrier.

20. An apparatus for wireless communication, the apparatus comprising:
   a memory; and
   at least one processor communicatively coupled to and the memory, wherein the at least one processor is configured to:
      transmit a first data utilizing a first frequency division duplex (FDD) carrier; and
      receive via a time division duplex (TDD) carrier or a second FDD carrier acknowledgment information corresponding to the first data,
   wherein the transmission of the first data utilizing the first FDD carrier is a retransmission of the first data after the first data is transmitted in a data portion of a TDD subframe and a second data is received in a feedback portion of the TDD subframe.

21. An apparatus for wireless communication, the apparatus comprising:
   a memory configured to store instructions; and
   at least one processor communicatively coupled to the memory, wherein the at least one processor is configured to execute the instructions to cause the apparatus to:
      receive a first data in a data portion of a time division duplex (TDD) subframe during a transmission time interval (TTI);
      transmit a second data in an uplink portion of the TDD subframe during the TTI, the second data being different from acknowledgment information corresponding to the first data; and
      transmit, via a frequency division duplex (FDD) carrier during the TTI, the acknowledgment information corresponding to the first data.

22. The apparatus of claim 21, wherein the TDD subframe includes scheduling information corresponding to at least one of the first data or the second data, the scheduling information in a control portion of the TDD subframe.

23. A wireless communication method, comprising:
   receiving a first data in a data portion of a time division duplex (TDD) subframe during a transmission time interval (TTI);
   transmitting a second data in an uplink portion of the TDD subframe during the TTI, the second data being different from acknowledgment information corresponding to the first data; and
   transmitting, via a frequency division duplex (FDD) carrier during the TTI, the acknowledgment information corresponding to the first data.

24. The method of claim 23, wherein the TDD subframe includes scheduling information corresponding to at least one of the first data or the second data, the scheduling information in a control portion of the TDD subframe.

* * * * *